(12) United States Patent
Murakami

(10) Patent No.: US 9,193,384 B1
(45) Date of Patent: Nov. 24, 2015

(54) STEERING APPARATUS

(71) Applicant: Showa Corporation, Gyoda-shi (JP)

(72) Inventor: Takuya Murakami, Haga-gun (JP)

(73) Assignee: SHOWA CORPORATION, Gyoda-Shi (JP)

(*) Notice: Subject to any disclaimer, the term of this patent is extended or adjusted under 35 U.S.C. 154(b) by 0 days.

(21) Appl. No.: 14/668,553

(22) Filed: Mar. 25, 2015

(30) Foreign Application Priority Data

Sep. 25, 2014 (JP) .................................. 2014-195767

(51) Int. Cl.
*B62D 5/04* (2006.01)
*B62D 7/22* (2006.01)
*F16H 55/24* (2006.01)

(52) U.S. Cl.
CPC .............. *B62D 7/226* (2013.01); *B62D 5/0421* (2013.01); *B62D 5/0454* (2013.01); *F16H 55/24* (2013.01)

(58) Field of Classification Search
CPC .... B62D 7/226; B62D 5/0454; B62D 5/0421; F16H 55/24
See application file for complete search history.

(56) References Cited

U.S. PATENT DOCUMENTS

| 4,700,589 | A  | * | 10/1987 | Coronel ............................ 475/6 |
| 7,798,283 | B2 | * | 9/2010 | Kokubo et al. ............... 180/444 |
| 8,727,065 | B2 | * | 5/2014 | Kuroumaru .................... 180/443 |
| 2007/0163374 | A1 | * | 7/2007 | Yamazaki et al. .............. 74/409 |
| 2007/0175696 | A1 |  | 8/2007 | Saito et al. |
| 2007/0227279 | A1 | * | 10/2007 | Watanabe et al. ............ 74/89.14 |
| 2009/0114470 | A1 | * | 5/2009 | Shimizu et al. ............... 180/444 |
| 2012/0018991 | A1 | * | 1/2012 | Murakami ..................... 280/777 |
| 2013/0068550 | A1 | * | 3/2013 | Gale ............................. 180/216 |
| 2013/0190986 | A1 | * | 7/2013 | Nishimori ....................... 701/41 |

FOREIGN PATENT DOCUMENTS

JP        2007-196927 A    8/2007

* cited by examiner

*Primary Examiner* — Kevin Hurley
*Assistant Examiner* — Gabriela C Craciun
(74) *Attorney, Agent, or Firm* — Leason Ellis LLP

(57) ABSTRACT

A steering apparatus includes: an output shaft that outputs a steering force to wheels of a vehicle; a steering arm which turns about the output shaft, and to which two tie rods, to which the wheels are respectively connected, are attached; a stopper which is provided in a vicinity of the output shaft, and restricts an angle of the turning of the steering arm; a worm wheel that is fixed to the output shaft; a worm that is driven by a motor, and meshes with the worm wheel; a bearing that rotatably support the worm; a housing that holds the bearing; and a worm damper that is provided at an axial inner side or an axial outer side of the bearing in an axial direction of the worm, and is elastically deformable so as to move the worm in the axial direction, as defined herein.

4 Claims, 25 Drawing Sheets

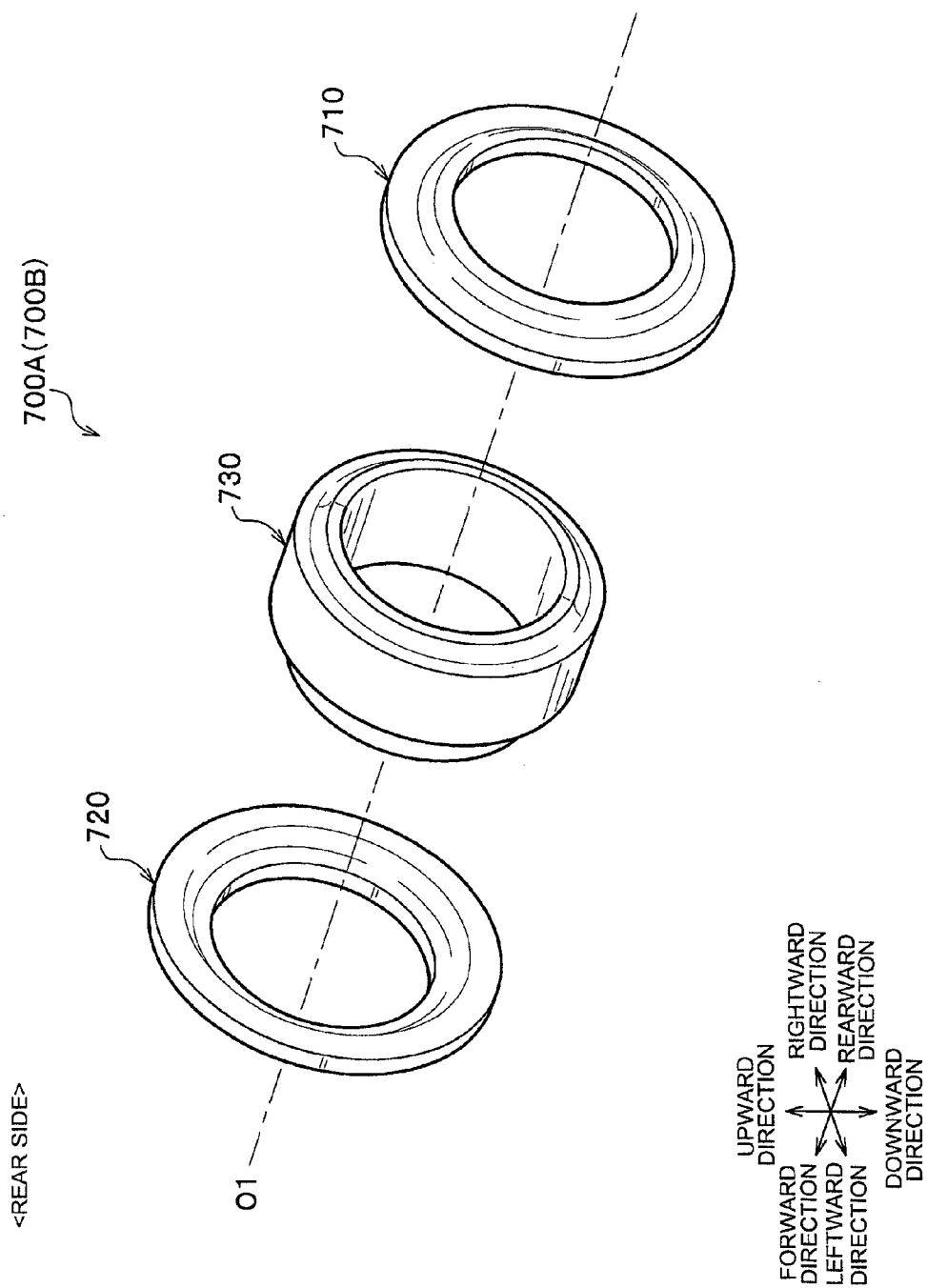

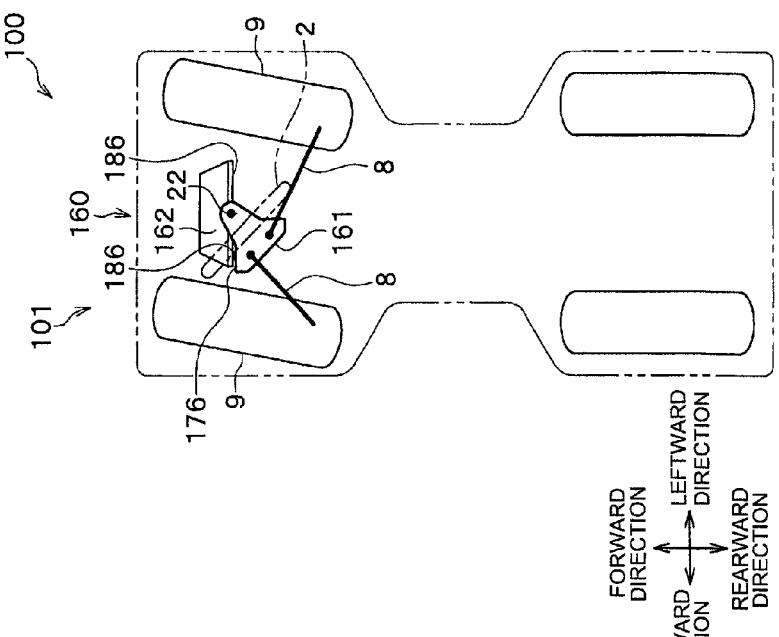
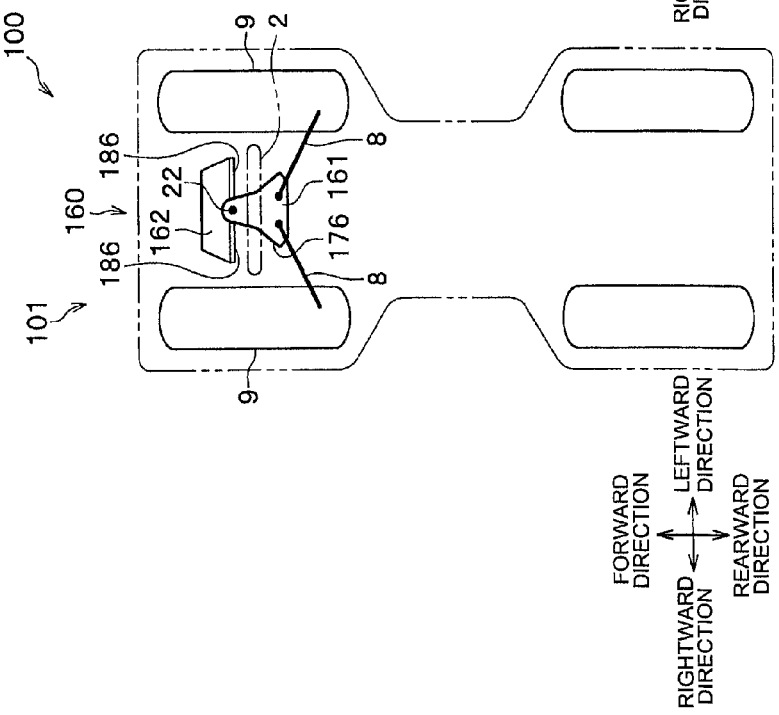

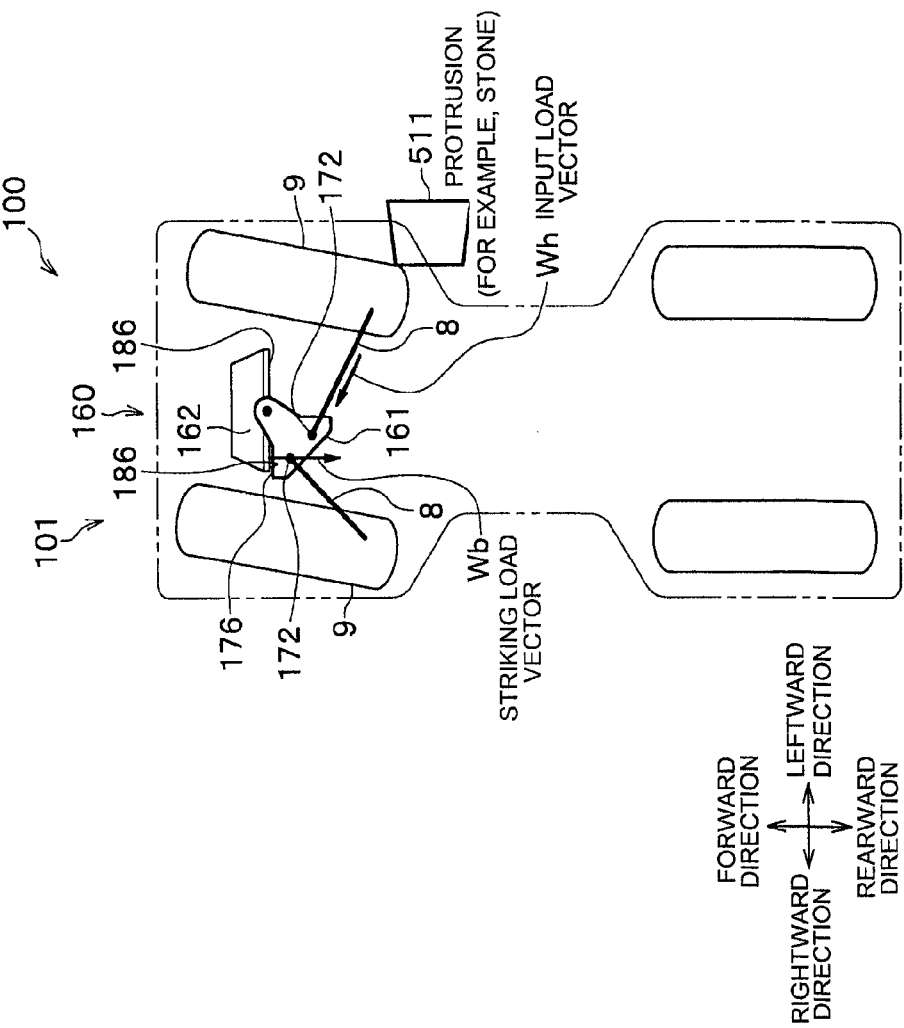

FIG. 11
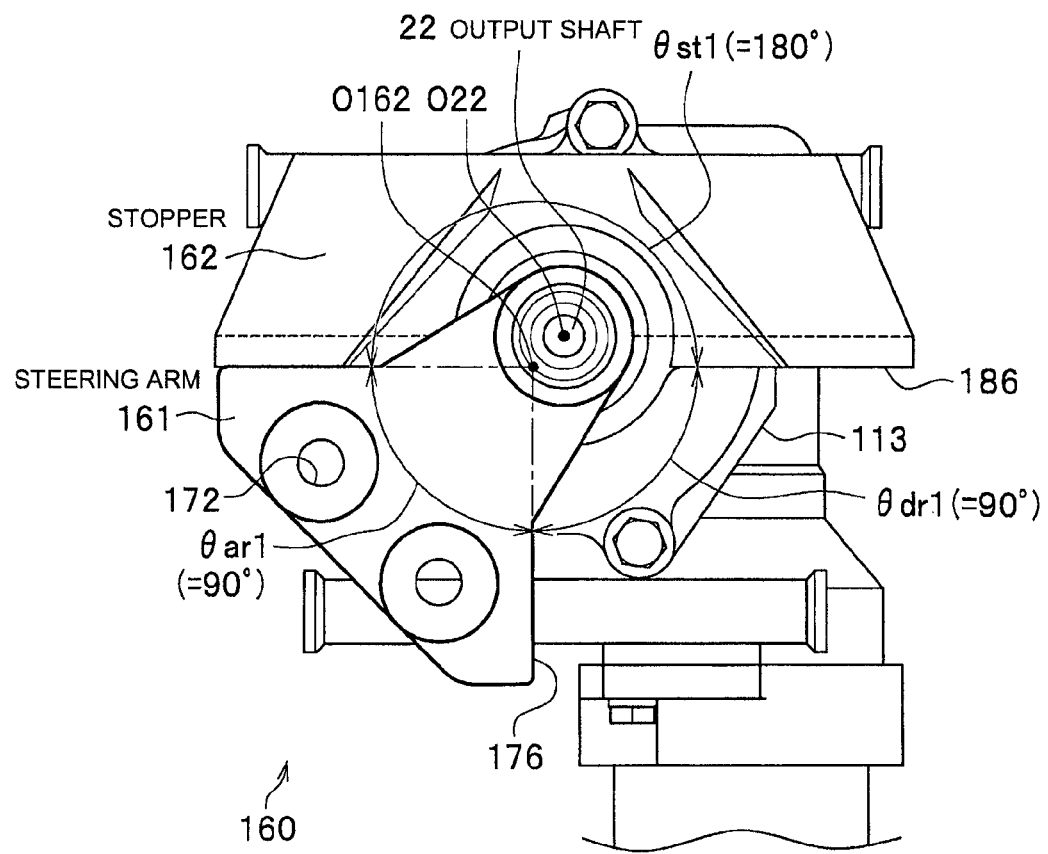
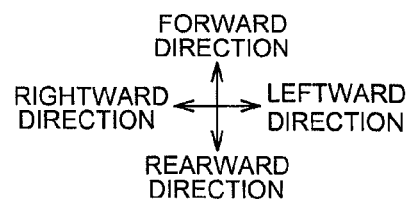

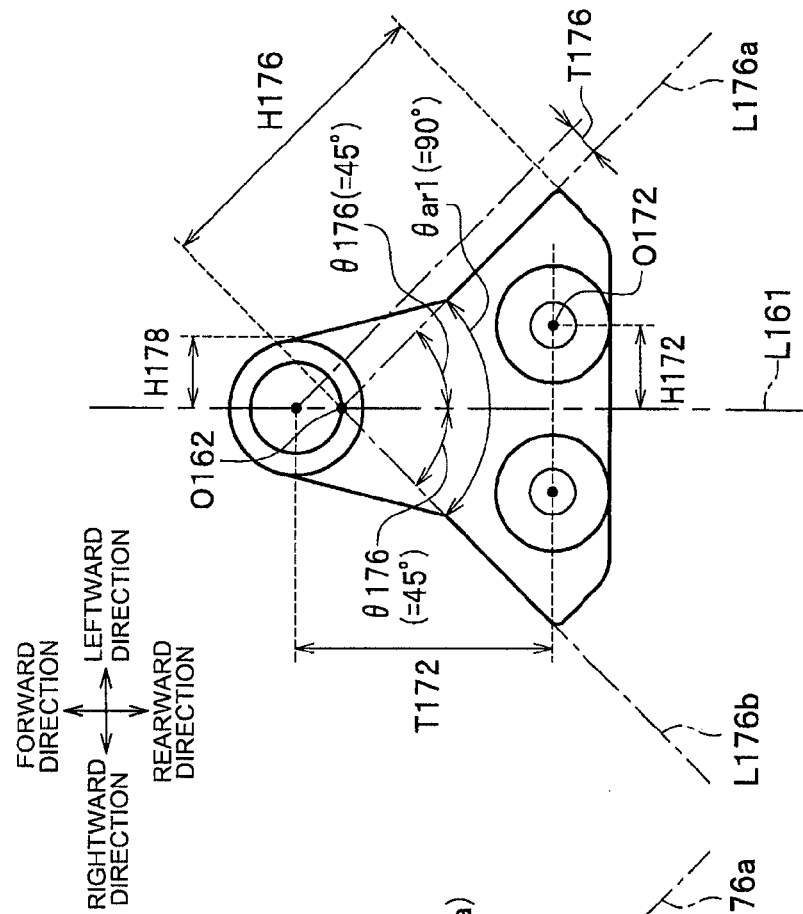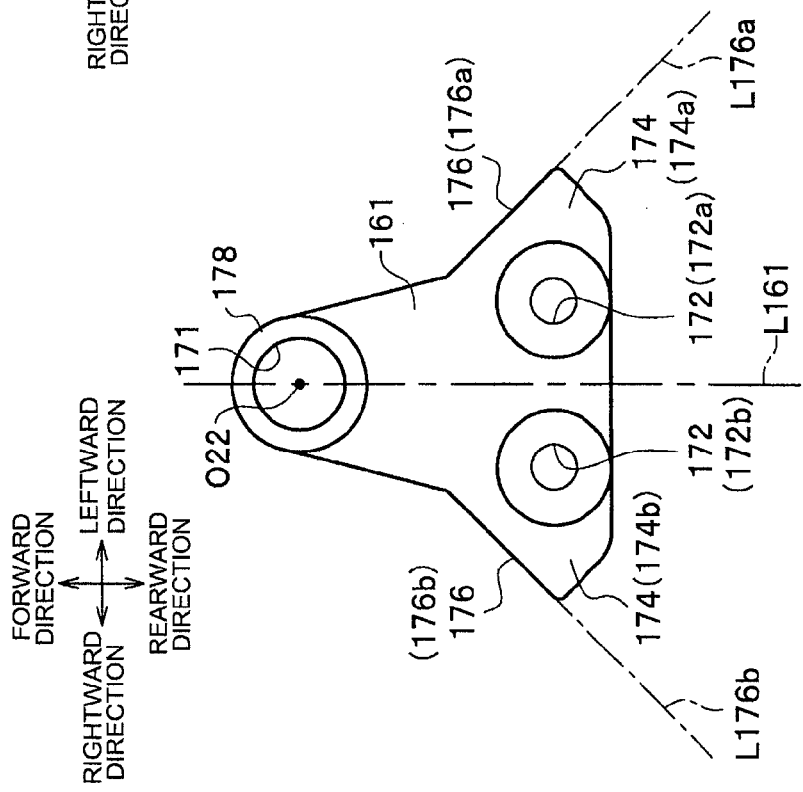

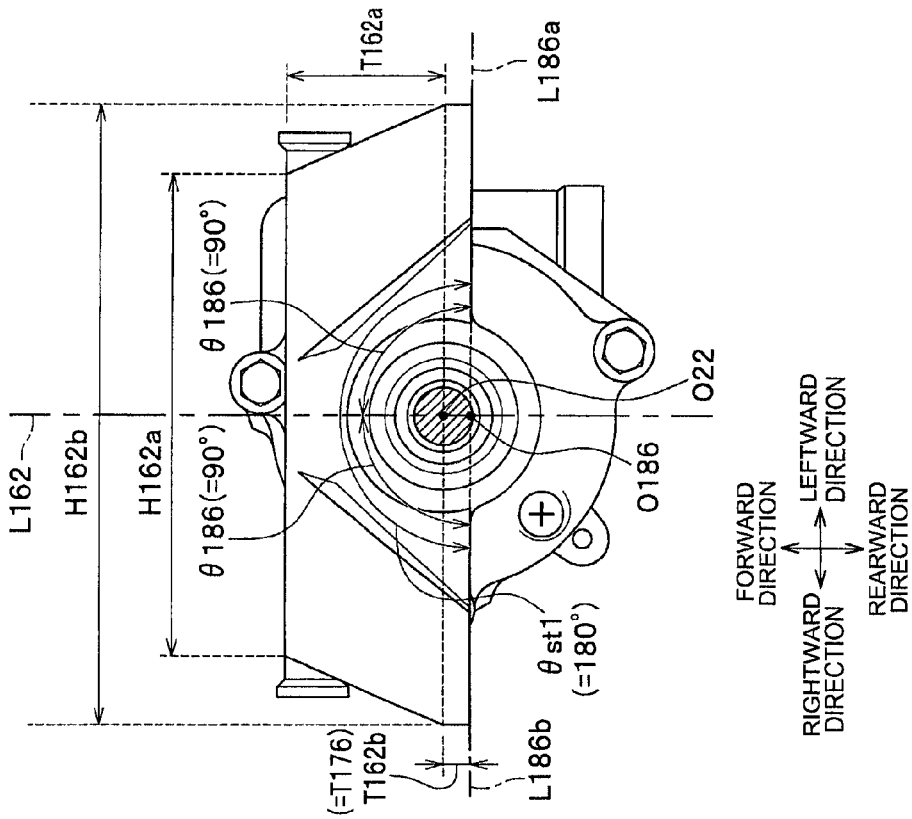
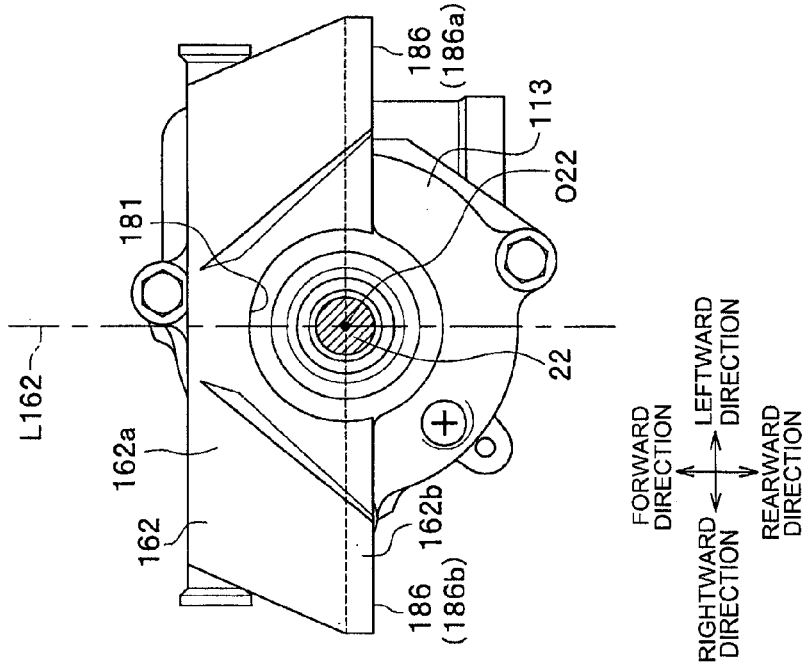
FIG. 13A
FIG. 13B

STEERING APPARATUS

CROSS-REFERENCE TO RELATED APPLICATIONS

This application claims the benefit of Japanese Patent Application JP 2014-195767, filed Sep. 25, 2014, the entire content of which is hereby incorporated by reference, the same as if set forth at length.

BACKGROUND OF THE INVENTION

1. Field of the Invention

The present invention relates to a steering apparatus.

2. Description of Related Art

In a saddle-type vehicle such as an all terrain vehicle (ATV), a steering apparatus (particularly, a motor-driven power steering apparatus) is installed between a steering shaft of handlebars and a steering member of wheels (front wheels). The motor-driven power steering apparatus is an apparatus that supplements a steering force applied by a driver on the handlebars with an assist torque that is generated from an electric motor.

The motor-driven power steering apparatus has built-in members such as an input shaft, a torsion bar, and an output shaft. The input shaft is connected to the steering shaft of the handlebars. The torsion bar connects the input shaft and the output shaft. A steering arm is attached to the output shaft (for example, refer to JP-A-2007-196927) (FIG. 2).

The steering arm is a steering member of the wheels (front wheels). The steering arm is configured to turn about the output shaft. The steering arm is provided with tie rod holes to which tie rods are respectively attached. The wheels are respectively connected to the tie rods.

When the driver turns the handlebars to the maximum steering angle or greater in a clockwise direction or a counter-clockwise direction, the motor-driven power steering apparatus is required to restrict the turning of the handlebars in such a manner that a vehicle does not roll over in a lateral direction. While the vehicle is traveling on a rough road, even without the driver's turning of the handlebars, an external force originating from a protrusion (convex portion) or the like on a road surface may be input to the motor-driven power steering apparatus and the handlebars via the wheels (front wheels), and thereby this may turn the handlebars to the maximum steering angle or greater. Even in this case, the motor-driven power steering apparatus is required to restrict the turning of the handlebars in such a manner that the vehicle does not roll over in the lateral direction. The motor-driven power steering apparatus is provided with an arm stopper mechanism for such a function which restricts the turning angle of the steering arm via a stopper.

The stopper is provided to protrude downward from a lower surface of a housing of the motor-driven power steering apparatus. When the driver turns the handlebars to the maximum steering angle or greater in the clockwise direction or the counter-clockwise direction, or when the handlebars turn to the maximum steering angle or greater due to an external force that is input via the wheels (front wheels), a striking surface of the steering arm strikes against a contact surface of the stopper. Accordingly, the turning angle of the steering arm is restricted by the arm stopper mechanism via the stopper, and thereby the turning of the handlebars is restricted.

In this motor-driven power steering apparatus, when a bending load applied to the output shaft increases, an excessive load may be applied to a bearing that supports the output shaft, or to a housing in the vicinity of the bearing. Accordingly, in the motor-driven power steering apparatus, a bending load is preferably prevented from being applied to the output shaft.

SUMMARY OF THE INVENTION

However, the motor-driven power steering apparatus in the related art has a problem in that since the arm stopper mechanism in the related art is not configured to prevent a bending load from being applied to the output shaft, a relatively large bending load may be applied to the output shaft, which will be described below.

For example, when one striking surface of the steering arm strikes against one contact surface of the stopper, the value of a bending load vector, which is applied to the output shaft and bends the output shaft, is the value of a combined vector of an input load vector which is input from the wheels via the tie rods, and a striking load vector which is applied to the striking surface of the steering arm from the stopper.

For this reason, as the angle made by the respective directions of the input load vector and the striking load vector decreases, the value of the bending load vector tends to increase. In contrast, as the angle made by the respective directions of the input load vector and the striking load vector increases, the value of the bending load vector tends to decrease.

Accordingly, for example, when the angle made by the respective directions of the input load vector and the striking load vector is an acute angle (angle of 0° or greater and less than 90°), the value of the bending load vector becomes greater than the value of a combined vector which is obtained when the input load vector is orthogonal to the striking load vector. In contrast, when the angle made by the respective directions of the input load vector and the striking load vector is an obtuse angle (angle of 90° to 180°), the value of the bending load vector becomes less than or equal to the value of a combined vector of the input load vector and the striking load vector which are orthogonal to each other.

When the striking surface of the steering arm is in contact with the contact surface of the stopper, the direction of the input load vector is determined by a direction in which the tie rod is attached to the tie rod hole. The direction of the striking load vector is perpendicular to the striking surface (or the contact surface of the stopper) of the steering arm. Accordingly, the striking load vector is applied to a center position (hereinafter, referred to as a "striking center position") of a contact portion between the striking surface of the steering arm and the contact surface of the stopper.

Here, a "center line of the entirety of the vehicle" refers to an imaginary straight line that passes through the center point of the vehicle in the lateral direction, and extends in a longitudinal direction of the vehicle, and a "starting point of the contact surfaces" refers to a point on the center line of the entirety of the vehicle where straight lines imaginary disposed along the two contact surfaces intersect with each other.

In the arm stopper mechanism in the related art, for example, the angle made by two striking surfaces of the steering arm is set to be 180°, and the angle made by two contact surfaces of the stopper is set to be 90° in such a manner that the angle made by the two contact surfaces of the stopper (angle between the two contact surfaces, and formed in the stopper (for example, refer to an angle θst in FIG. 23B)) is smaller than the angle made by the two striking surfaces of the steering arm (angle between the two striking surfaces, and formed in the steering arm (for example, refer to an angle θar in FIG. 22B)).

In the arm stopper mechanism in the related art, since the angle made by the two contact surfaces of the stopper is set to be 90°, two striking centers are respectively positioned at 45° right and 45° left from "a starting point of the contact surfaces" with respect to the "center line of the entirety of the vehicle".

In the arm stopper mechanism in the related art, when one striking surface of the steering arm strikes against one contact surface of the stopper, the striking load vector is applied to the striking center position in a direction which is oriented at 45° with respect to the "center line of the entirety of the vehicle". In the arm stopper mechanism in the related art, because of the attachment direction of the tie rods, the input load vector is applied to the surroundings of the tie rod holes in a direction in which the angle made by the input load vector and the striking load vector becomes an acute angle (angle of 0° or greater and less than 90°) (refer to FIG. 24).

In designing the configuration of the arm stopper mechanism in the related art, the angle made by the respective directions of the input load vector and the striking load vector is not taken into consideration. For this reason, in the related art, in the motor-driven power steering apparatus using the arm stopper mechanism, a relatively large bending load may be applied to the output shaft, and at this time, an excessive load may be applied to the bearing that supports the output shaft, or to the housing in the vicinity of the bearing.

According to consideration in this regard by the inventor of the present invention, since the bending load vector is a combined vector of the input load vector and the striking load vector, it is possible to prevent the occurrence of a bending load by configuring the arm stopper mechanism in such a manner that the input load vector and the striking load vector cancel each other out.

According to the inventor of the present invention, it is possible to prevent the occurrence of a bending load by configuring the arm stopper mechanism in such a manner that a relationship between the angle between the two contact surfaces of the stopper and the angle between the two striking surfaces of the steering arm is reverse to that in the arm stopper mechanism in the related art (that is, in such a manner that the angle between the two contact surfaces of the stopper is greater than the angle between the two striking surfaces of the steering arm), and the angle between the two contact surfaces of the stopper is set to be greater than or equal to the angle (90°) of the arm stopper mechanism in the related art.

In the motor-driven power steering apparatus in the related art, an assist force of the electric motor is transmitted to the output shaft via a worm (drive gear) fixed to a motor output shaft, and a worm wheel (driven gear) that meshes with the worm and is fixed to the output shaft. In this configuration, it is necessary to form an appropriate backlash (gap) between a gear tooth surface of the worm (worm gear tooth) and a gear tooth surface of the worm wheel (wheel gear tooth). The worm is fixed and cannot move in an axial direction.

Specifically, for example, when the backlash is too small, the worm gear teeth and the wheel gear teeth are thrust against each other, and a working torque (torque for rotating the worm and the worm wheel) increases, and thereby it is difficult to turn the handlebars to the original position. A method of improving the machining precision of the worm gear teeth and the wheel gear teeth can be used so as to obtain an appropriate backlash, but the use of the method results in an increase in manufacturing costs.

In contrast, when an external force is input to the output shaft from a road surface in a state where the backlash is too large, a main shaft and the worm wheel rapidly rotate due to the amount of backlash, and the wheel teeth collide with the worm gear teeth, and thereby this results in the occurrence of a loud hitting sound (tapping sound).

The present invention is made in light of the problems, and an object of the present invention is to provide a steering apparatus in which a bending load applied to an output shaft is reduced, and an appropriate backlash is formed between a worm and a worm wheel.

According to an aspect of the present invention, there is provided a steering apparatus including: an output shaft that outputs a steering force to wheels of a vehicle; a steering arm which turns about the output shaft, and to which two tie rods, to which the wheels are respectively connected, are attached; a stopper which is provided in a vicinity of the output shaft, and restricts an angle of the turning of the steering arm; a worm wheel that is fixed to the output shaft; a worm that is driven by a motor, and meshes with the worm wheel; a bearing that rotatably supports the worm; a housing that holds the bearing; and a worm damper that is provided at an axial inner side or an axial outer side of the bearing in an axial direction of the worm, and is deformable so as to move the worm in the axial direction. When an imaginary straight line that passes through the output shaft and extends in a longitudinal direction of the vehicle is defined as a center line of the steering arm, the steering arm includes, in a neutral state: an output shaft hole which is provided on the center line, and into which the output shaft is fitted; two tie rod holes which are respectively provided at positions that are separated by a distance from the center line to a right and a left, and that are separated by a distance from the output shaft hole to a rear side of the vehicle, and to which the tie rods are respectively attached; and two striking surfaces which are respectively provided at positions that are separated by a distance from the center line to a right and a left, and that are separated by a distance from the output shaft hole to a rear side of the vehicle, and which are to strike against the stopper. The stopper includes two contact surfaces that are respectively provided at positions that are separated by a distance from the center line to a right and a left, and that are present in a turning direction of the striking surfaces of the steering arm, and that are respectively to be brought into contact with the striking surfaces. An angle made by the two contact surfaces of the stopper is greater than an angle made by the two striking surfaces of the steering arm, and is 90° or greater.

A bending load vector is a combined vector of an input load vector and a striking load vector. For this reason, when the input load vector and the striking load vector are applied to cancel each other out, it is possible to reduce the bending load. The configuration in which the input load vector and the striking load vector cancel each other out is realized by increasing an angle made by the respective directions of the input load vector and the striking load vector. The configuration in which the angle made by the respective directions of the input load vector and the striking load vector is increased can be realized by decreasing an angle made by the center line and the striking surface in the steering arm (angle between the center line and the striking surface in the steering arm, and an angle formed in the steering arm, for example, an angle θ176 illustrated in FIG. 12B), or by increasing an angle made by a center line and the contact surface in the stopper (angle between the center line and the contact surface in the stopper, and an angle formed in the stopper, for example, an angle θ186 illustrated in FIG. 13B).

In the steering apparatus according to the aspect of the present invention, the angle made by the two contact surfaces of the stopper is greater than the angle made by the two striking surfaces of the steering arm, and is 90° or greater. With this configuration of the arm stopper mechanism, the input load vector and the striking load vector can be applied to cancel each other out. As a result, in the steering apparatus according to the aspect of the present invention, it is possible to reduce the value of the bending load vector applied to the output shaft, and thereby it is possible to reduce a bending load applied to the output shaft. Accordingly, in the steering apparatus according to the aspect of the present invention, it is possible to reduce a load applied to the bearing and the housing in the vicinity of the bearing.

Since the worm can move in the axial direction by virtue of the elastic deformation of the worm damper which is provided at the axial inner side or the axial outer side of the bearing in the axial direction of the worm, an appropriate backlash is obtained between worm teeth and wheel teeth.

In the steering apparatus, the worm preferably includes worm gear teeth that mesh with the worm wheel. The worm damper is preferably disposed between the bearing and the worm gear teeth.

In the steering apparatus, the worm damper preferably has a ring shape, through which the worm passes, and preferably includes a first ring-shaped plate, a second ring-shaped plate, and a ring-shaped elastic body that is interposed between the first and second ring-shaped plates and is elastically deformable.

According to the present invention, it is possible to provide the steering apparatus in which a bending load applied to the output shaft is reduced, and an appropriate backlash is formed between the worm and the worm wheel.

BRIEF DESCRIPTION OF THE DRAWINGS

FIG. 6 is an exploded perspective view of the rear worm damper.

FIGS. 9A and 9B are schematic bottom views illustrating an operational relationship between the steering arm of the arm stopper mechanism according to the first embodiment and the front wheels.

FIG. 10 is a view illustrating load vectors applied to the steering arm of the arm stopper mechanism according to the first embodiment.

FIG. 11 is a schematic bottom view illustrating the configuration of the arm stopper mechanism according to the first embodiment.

FIGS. 12A and 12B are schematic bottom views illustrating the steering arm of the arm stopper mechanism according to the first embodiment.

FIGS. 13A and 13B are schematic bottom views illustrating the configuration of a stopper of the arm stopper mechanism according to the first embodiment.

DETAILED DESCRIPTION OF THE INVENTION

Figure 1:
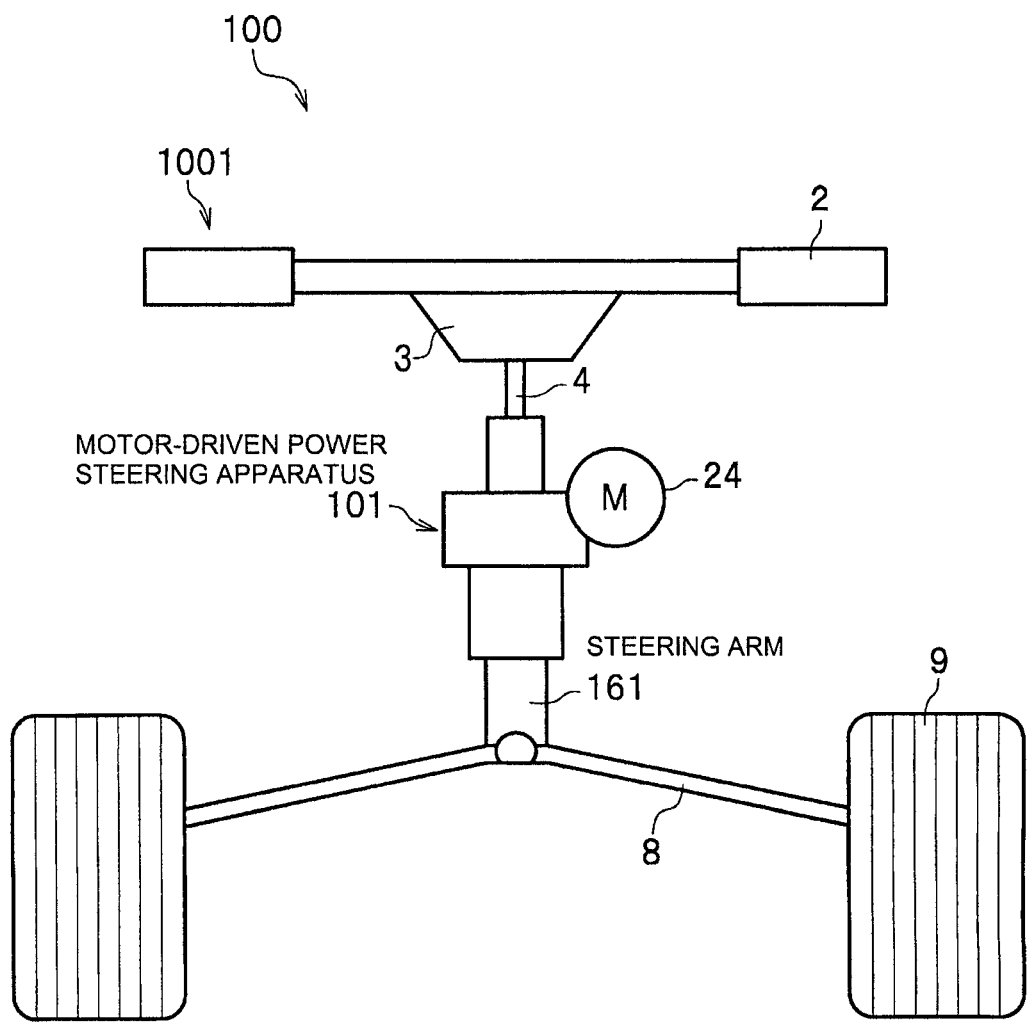
FIG. 1 is a schematic view illustrating the configuration of a saddle-type vehicle.

Hereinafter, embodiments of the present invention (hereinafter, referred to as the "embodiments") will be described in detail with reference to the accompanying drawings. The drawings are schematically illustrated to the extent that persons skilled in the art can sufficiently understand the present invention. Accordingly, the present invention is not limited to only the examples which are illustrated. In the drawings, the same reference signs are assigned to common configuration elements or similar configuration elements, and descriptions thereof will be omitted.

Here, an "upward" direction, a "downward" direction, a "forward" direction, a "rearward" direction, a "leftward" direction and a "rightward" direction are defined based on the orientation of the vehicle. In some drawings, the configurations when seen from the bottom of the vehicle are illustrated. In these drawings, the "rightward" direction and the "leftward" direction are seen as if being reversed. However, since the "rightward" and "leftward" directions indicate the directions defined in the bottom view configuration of the vehicle, the "rightward" and "leftward" directions can be accepted as illustrated in the drawings.

First Embodiment

Hereinafter, the configuration of an arm stopper mechanism 160 (refer to FIG. 2) of a motor-driven power steering apparatus 101 according to a first embodiment will be described. Here, the characteristics of the arm stopper mechanism 160 according to the first embodiment will be described in the following sequence for descriptive purposes.

1: Schematic Configurations of Saddle-type Vehicle and Motor-driven Power Steering Apparatus 2: Schematic Configuration between Steering Arm and Wheels (Front Wheels)

3: Load Vector Applied to Steering Arm 4-1: Configuration of Arm Stopper Mechanism According to Comparative Example 4-2: Load Vectors Applied to Main Portions of Arm Stopper Mechanism According to Comparative Example 5: Relationship between Input Load Vector, and Striking Load Vector, and Bending Load Vector 6-1: Configuration of Arm Stopper Mechanism According to First Embodiment 6-2: Load Vectors Applied to Main Portions of Arm Stopper Mechanism According to First Embodiment 1: Schematic Configurations of Saddle-Type Vehicle and Motor-Driven Power Steering Apparatus First, the schematic configuration of a saddle-type vehicle 100 will be described with reference to FIG. 1. FIG. 1 is a schematic view illustrating the configuration of the saddle-type vehicle 100. The saddle-type vehicle 100 is a vehicle equipped with the motor-driven power steering apparatus 101 that is provided with the arm stopper mechanism 160 according to the first embodiment.

As illustrated in FIG. 1, the saddle-type vehicle 100 is an all terrain vehicle (ATV) such as a buggy vehicle or a snowmobile, and has a steering system 1001. The steering system 1001 includes handlebars 2; a handle stay 3; a steering shaft 4; right and left tie rods 8; right and left front wheels (front wheels) 9; and a motor-driven power steering apparatus (steering apparatus) 101. That is, the motor-driven power steering apparatus 101 is installed between the steering shaft 4 and the right and left tie rods 8.

Figure 2:
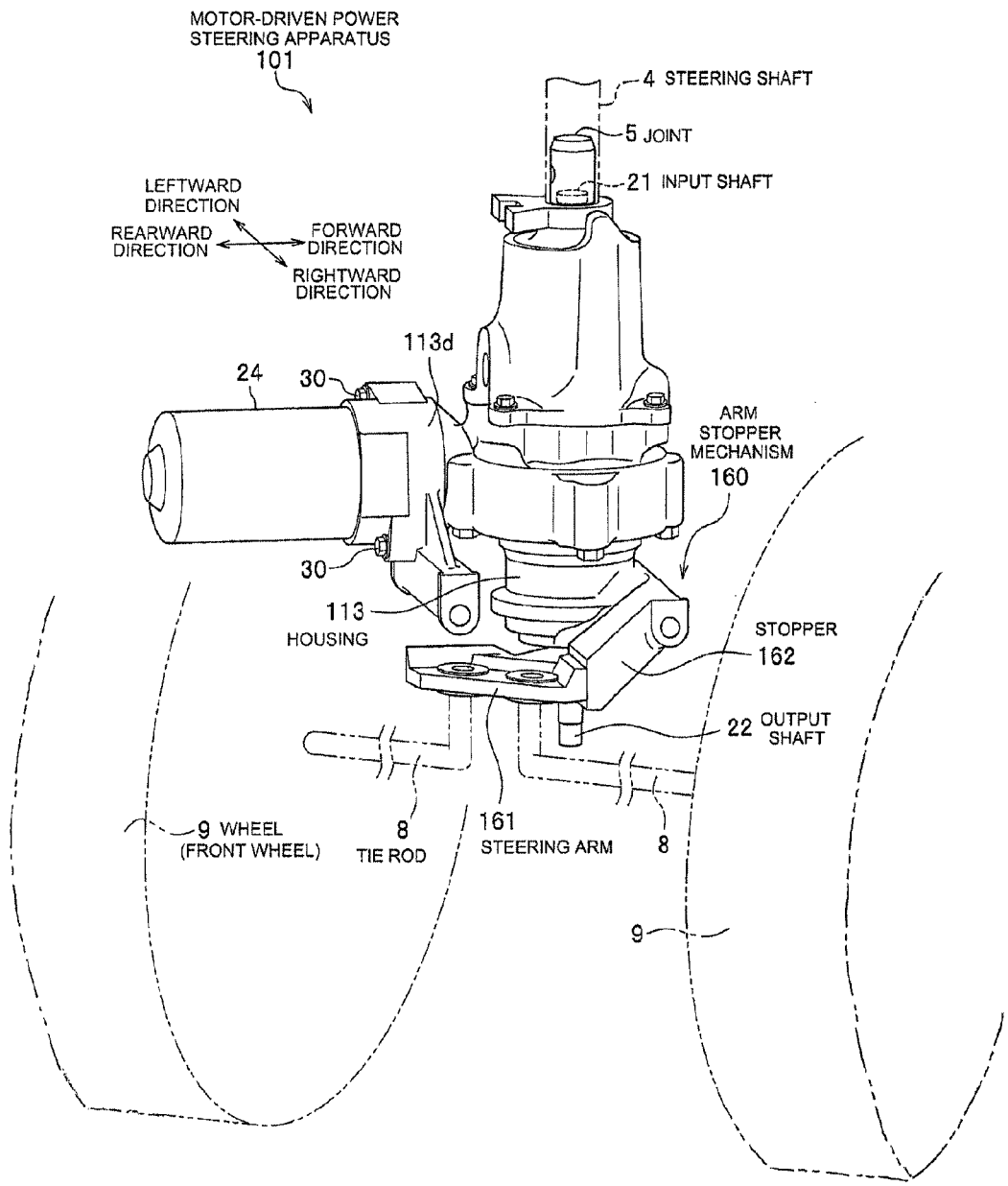
FIG. 2 is a schematic view illustrating the configuration of a motor-driven power steering apparatus with an arm stopper mechanism according to a first embodiment as seen from a right rear side.
Figure 3:
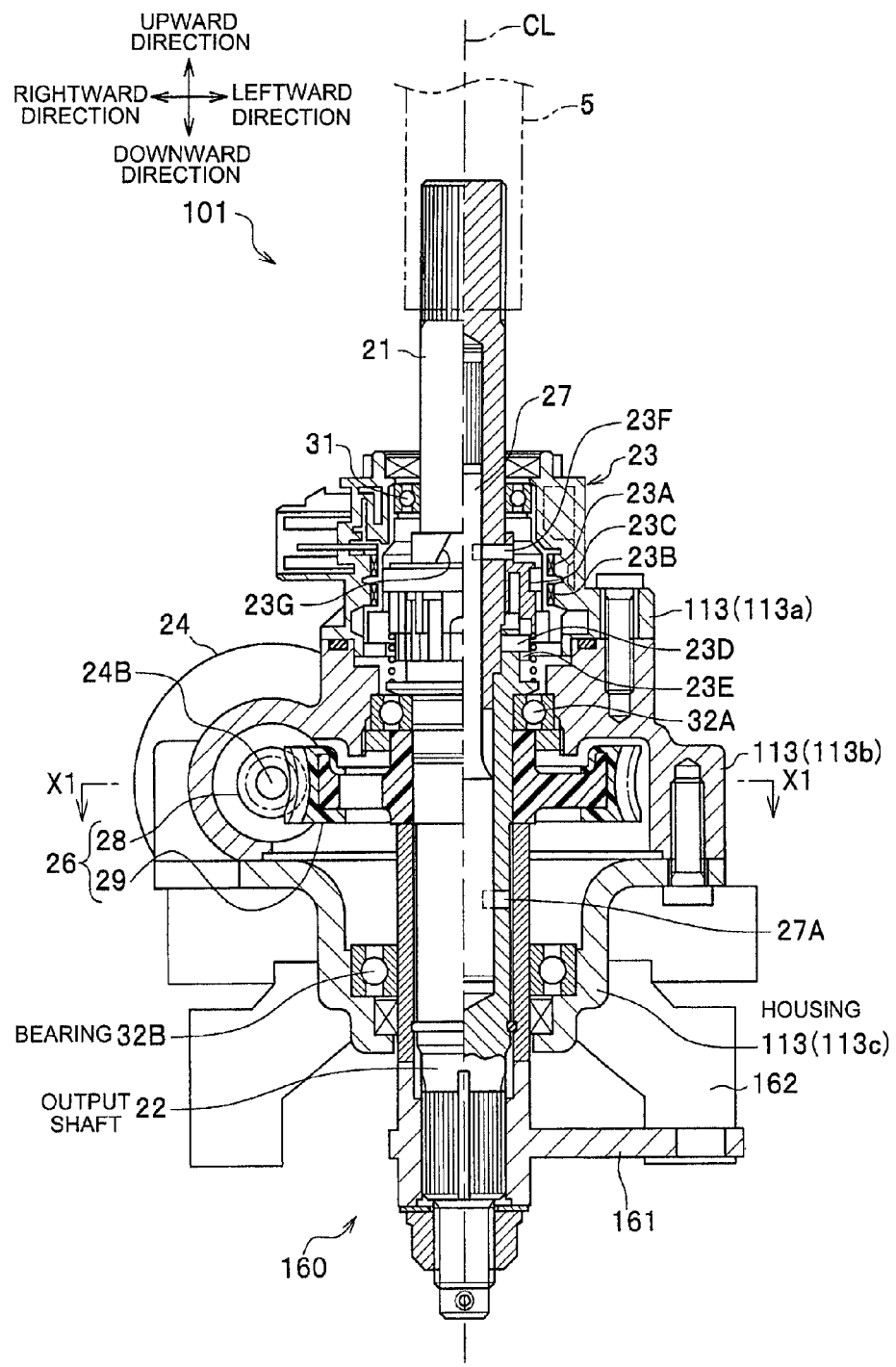
FIG. 3 is a schematic view (vertical cross-sectional view) illustrating the internal configuration of the motor-driven power steering apparatus with the arm stopper mechanism according to the first embodiment, and illustrates a cross section taken along line III2-III2 in FIG. 4.

As illustrated in FIGS. 2 and 3, the motor-driven power steering apparatus 101 includes an input shaft 21 that is connected to the steering shaft 4 connected to steering handlebars (handlebars 2); a torsion bar 27; an output shaft 22 that is connected to the input shaft 21 via the torsion bar 27; a torque sensor 23 that detects a steering state of the handlebars 2; an electric motor 24; an electronic control unit (ECU) (not illustrated) that controls the electric motor 24 based on a detection signal from the torque sensor 23; a torque transmission mechanism 26 that transmits a generated torque of the electric motor 24 to the output shaft 22; a housing 113; and the arm stopper mechanism 160. The input shaft 21, the torsion bar 27, and the output shaft 22 are disposed on the same center axis CL.

In FIG. 3, the housing 113 is a metal body having a substantially cylindrical shape, and is made by assembling together a first housing 113a, a second housing 113b, and a third housing 113c which are sequentially disposed from the top of the housing 113. The input shaft 21 is connected to the steering shaft 4 via a joint 5, and the first housing 113a turnably supports the input shaft 21 via a bearing 31. The second housing 113b turnably supports the output shaft 22 via a bearing 32A, and the third housing 113c turnably supports the output shaft 22 via a bearing 32B. A steering arm 161 of the arm stopper mechanism 160 is attached to the vicinity of a lower end of the output shaft 22. An upper end of the torsion bar 27 is inserted into a hollow portion of the input shaft 21, and is serration-joined thereto. A lower end of the torsion bar 27 is inserted into a hollow portion of the output shaft 22, and is connected to a connection pin 27A.

The torque sensor 23 includes two detecting coils 23A and 23B in the first housing 113a, and the detecting coils 23A and 23B surround a cylindrical core 23C that is engaged with the input shaft 21 and the output shaft 22. The core 23C includes a vertical groove 23E that is engaged with a guide pin 23D of the output shaft 22, and a spiral groove 23G that is engaged with a slider pin 23F of the input shaft 21, and the core 23C can move only in an axial direction.

Accordingly, when a steering torque applied to the handlebars 2 (refer to FIG. 1) is transmitted to the input shaft 21, and the input shaft 21 and the output shaft 22 are displaced relative to each other in a turning direction due to the elastic torsional deformation of the torsion bar 27, the displacement of the input shaft 21 and the output shaft 22 in the turning direction makes the core 23C be displaced in the axial direction. The inductance of the detecting coils 23A and 23B changes due to a magnetic change in the vicinity of the detecting coils 23A and 23B, and the magnetic change originates from the axial displacement of the core 23C. That is, when the core 23C moves toward the input shaft 21, the inductance of the detecting coil 23A close to the core 23C increases, and the inductance of the detecting coil 23B distant from the core 23C decreases, and it is possible to detect a steering torque from a change in the inductance.

The motor-driven power steering apparatus 101 includes a worm wheel 610; a worm 620; a first bearing 630; a second bearing 640; a joint 650; a first worm damper 700A; and a second worm damper 700B. That is, the torque transmission mechanism 26 includes the worm wheel 610 and the worm 620.

Worm Wheel

Figure 4:
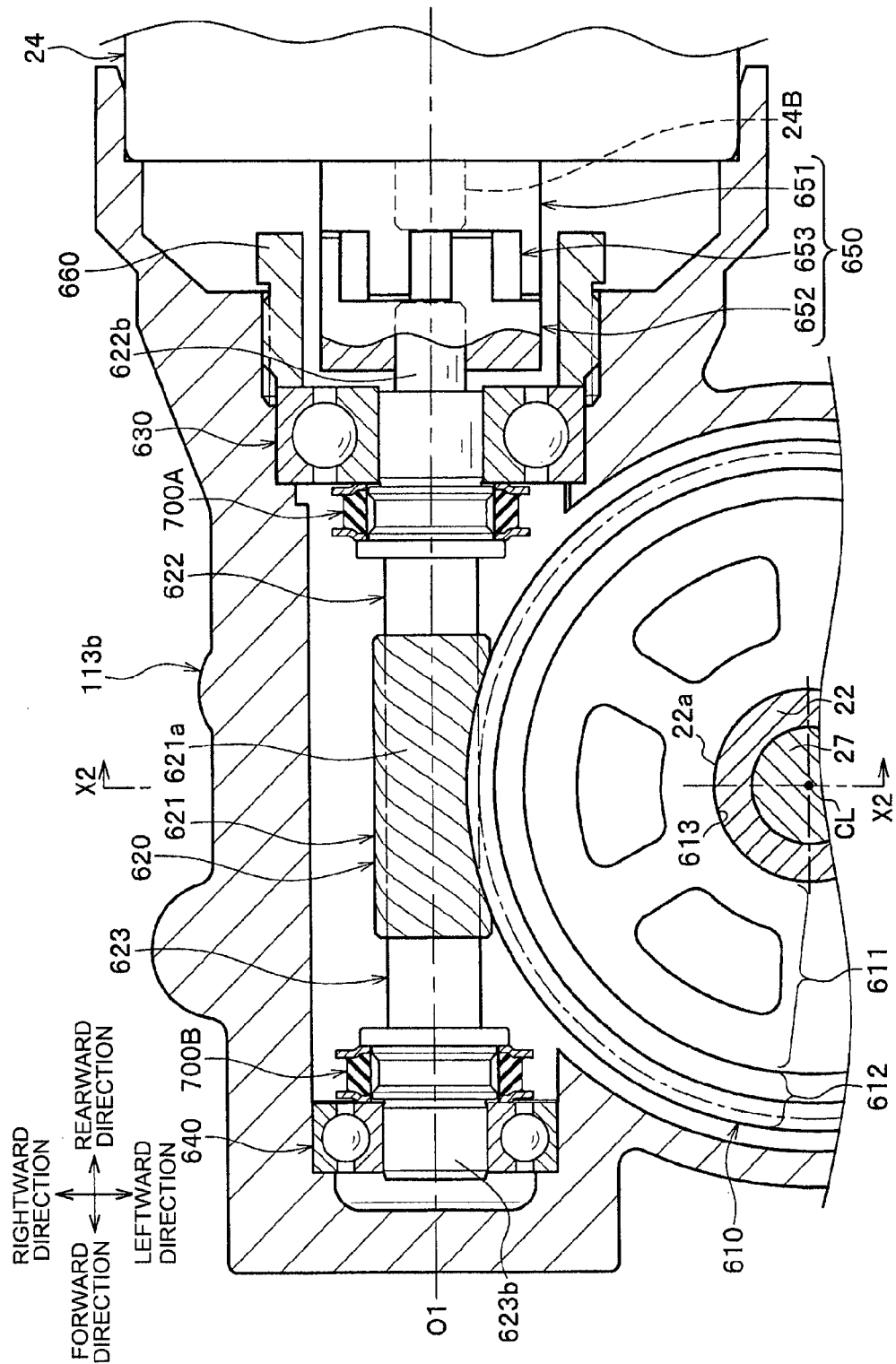
FIG. 4 is a cross-sectional plan view of the motor-driven power steering apparatus according to the first embodiment, and illustrates a cross section taken along line IV1-IV1 in FIG. 2.

As illustrated in FIGS. 3 and 4, the worm wheel 610 is fixed to the output shaft 22. As illustrated in FIG. 4, the worm wheel 610 includes a hub portion 611 (inner hub) on a radial inner side, and a gear toothed portion 612 having a ring shape which is fixed to a radial outer side of the hub portion 611, and on the outer circumferential surface of which gear teeth are formed. The hub portion 611 and the gear toothed portion 612 are made of resin, for example, ABS resin or amide resin.

Accordingly, the weight of the worm wheel 610 is less than that of a worm wheel with a core bar made of metal in the related art, and thereby weight reduction is achieved, and the inertia decreases. Accordingly, for example, the worm wheel 610 can rapidly transition from a stop state to a rotating state, and torque is transmitted from the electric motor 24 to the worm wheel 610.

A radial outer end of the hub portion 611 is embedded in the gear toothed portion 612 (refer to FIG. 3), and the hub portion 611 and the gear toothed portion 612 are integrally made using bi-color molding. The hub portion 611 and the gear toothed portion 612 may be molded into a single body.

The hub portion 611 is serration-joined to the output shaft 22. That is, a serration hole 613 is formed on a center axis line of the hub portion 611, and a serration shaft 22a is formed on an outer circumferential surface of the output shaft 22. Here, since the hub portion 611 made of resin is easy to slightly deform compared to the hub portion 611 made of metal, it is easy to assemble the hub portion 611 onto the output shaft 22 made of metal.

Since the hub portion 611 and the output shaft 22 are serration-joined to each other, the hub portion 611 and the output shaft 22 will not be out of alignment in the axial direction and a circumferential direction. Accordingly, the torque of the electric motor 24 is satisfactorily transmitted from the hub portion 611 to the output shaft 22. The hub portion 611 may be molded integrally with the output shaft 22 by flowing melted resin into the circumference of the serration shaft 22a of the output shaft 22.

A method of fixing together the hub portion 611 and the output shaft 22 is not limited to the above-mentioned methods, and for example, (1) a detent portion (surface) such as knurls may be formed on the outer circumferential surface of the output shaft 22, and the detent portion may be press fitted into the hub portion 611. (2) The hub portion 611 and the output shaft 22 may be spline-joined together.

Worm

The worm 620 is driven by the electric motor 24, and meshes with the worm wheel 610. That is, the worm 620 is a component having a columnar shape, which rotates about a rotation axis line O1 (refer to FIG. 4), and includes a worm main body 621 that has gear teeth (worm gear teeth) 621a on the circumferential surface thereof; a first shaft portion 622 that extends rearward from a rear side (side near the electric motor 24, a first end) of the worm main body 621; and a second shaft portion 623 that extends forward from a front side (second end) of the worm main body 621.

First Shaft Portion of Worm

The first shaft portion 622 includes a first supported portion 622a that is rotatably supported by the first bearing 630; a first insertion piece 622b that is inserted into a second coupling 652 at the rear of the first supported portion 622a; a first flange portion 622c that is disposed in front of the first supported portion 622a, and protrudes outward in the radial direction; and a first insertion portion 622d that is disposed between the first flange portion 622c and the first supported portion 622a.

The outer diameter of the first supported portion 622a is slightly smaller than the inner diameter of a first inner ring 631. Accordingly, the first supported portion 622a can slide against the first inner ring 631 in the axial direction.

The first insertion piece 622b is inserted into the second coupling 652, and is spline-joined to the second coupling 652.

The first flange portion 622c is in contact with a second plate 720 of the first worm damper 700A, and the first worm damper 700A is axially interposed between the first flange portion 622c and the first inner ring 631. When a rearward force is axially applied to the worm 620, the first flange portion 622c moves slightly rearward, and compresses an elastic body 730 made of rubber. In an alternative configuration, the first shaft portion 622 may not be provided with the first flange portion 622c, the worm main body 621 may be made to extend rearward, and a rear end surface of the worm main body 621 may come into contact with the second plate 720.

The first insertion portion 622d is loosely inserted into the first worm damper 700A, and has an outer diameter smaller than the inner diameter of an insertion hole 701. Accordingly, the first insertion portion 622d can move rearward without being in contact with the first worm damper 700A.

A rear flange portion 622e is formed on a rear side of the first insertion portion 622d. With the worm 620 in a neutral state (refer to FIG. 5A), a gap is formed between the rear flange portion 622e and the first inner ring 631. In contrast, when the worm 620 moves rearward, the rear flange portion 622e comes into contact with the first inner ring 631, and thereby the worm 620 is prevented from excessively moving rearward. That is, the rear flange portion 622e functions as a stopper that comes into contact with the first inner ring 631.

Second Shaft Portion of Worm

The second shaft portion 623 includes a second supported portion 623a that is rotatably supported by the second bearing 640; a second flange portion 623c that is disposed at the rear of the second supported portion 623a, and protrudes outward in the radial direction; and a second insertion portion 623d that is disposed between the second flange portion 623c and the second supported portion 623a.

The outer diameter of the second supported portion 623a is slightly smaller than the inner diameter of a second inner ring 641. Accordingly, the second supported portion 623a can slide against the second inner ring 641 in the axial direction.

The second flange portion 623c is in contact with a first plate 710 of the second worm damper 700B, and the second worm damper 700B is axially interposed between the second flange portion 623c and the second inner ring 641. When a forward force is axially applied to the worm 620, the second flange portion 623c moves slightly forward, and compresses the elastic body 730 made of rubber. In an alternative configuration, the second shaft portion 623 may not be provided with the second flange portion 623c, the worm main body 621 may be made to extend forward, and a front end surface of the worm main body 621 may come into contact with the first plate 710.

The second insertion portion 623d is loosely inserted into the second worm damper 700B, and has an outer diameter smaller than the inner diameter of the insertion hole 701. Accordingly, the second insertion portion 623d can move forward without being in contact with the second worm damper 700B.

A front flange portion 623e is formed on a front side of the second insertion portion 623d. With the worm 620 in a neutral state (refer to FIG. 5B), a gap is formed between the front flange portion 623e and the second inner ring 641. In contrast, when the worm 620 moves forward, the front flange portion 623e comes into contact with the second inner ring 641, and thereby the worm 620 is prevented from excessively moving forward. That is, the front flange portion 623e functions as a stopper that comes into contact with the second inner ring 641.

Electric Motor

The electric motor 24 is an electric motor that is driven to generate an assist force according to a command from the electronic control unit (ECU) (not illustrated). As illustrated in FIG. 2, the electric motor 24 is attached to a motor attachment seat 113d of the second housing 113b using attachment bolts 30. The ECU detects a torsional torque originating from the torsion bar 27 using the torque sensor 23, and drives the electric motor 24 which generates an assist force according to the magnitude of the torsional torque.

Joint

Figure 7:
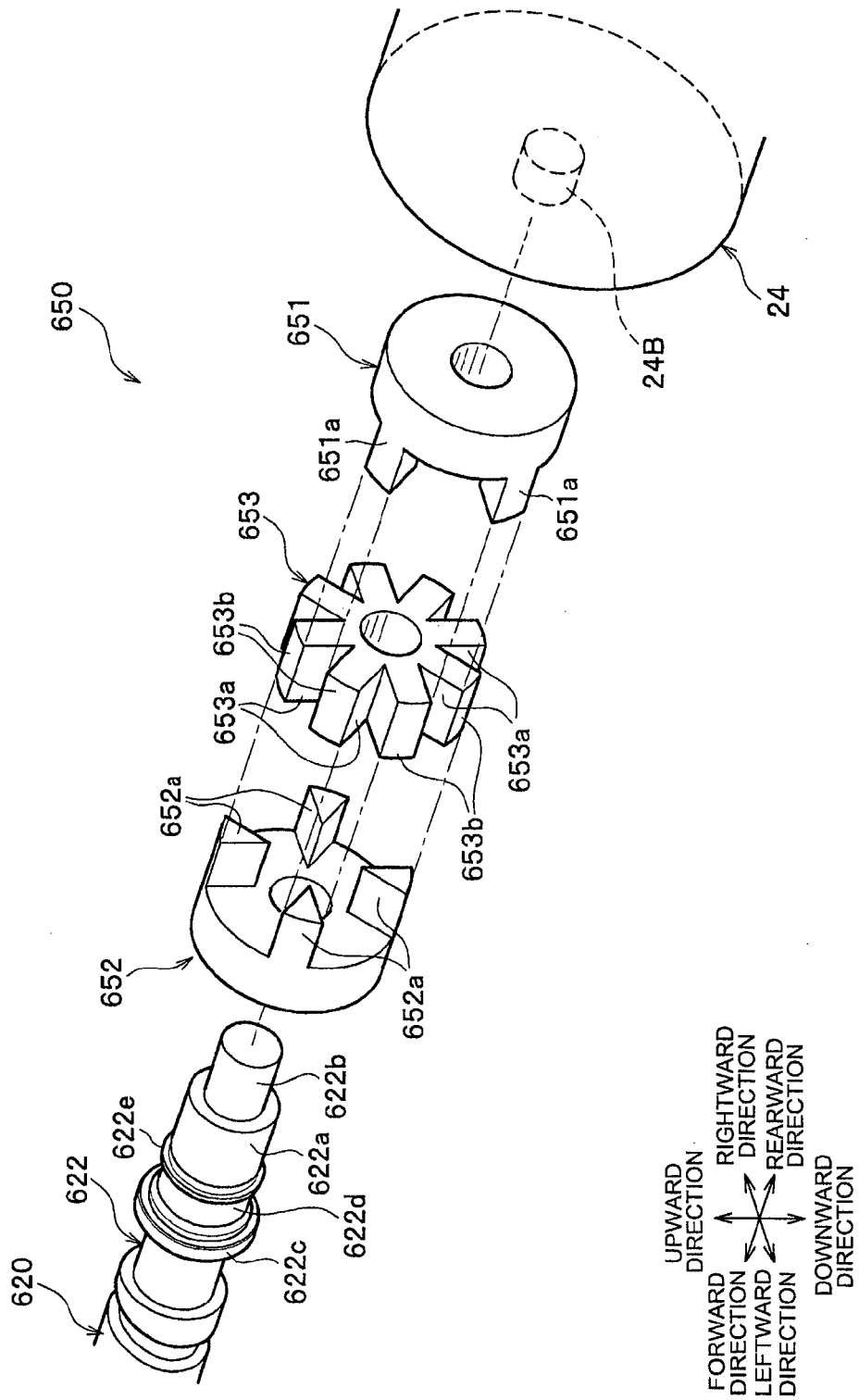
FIG. 7 is an exploded perspective view of a joint according to the first embodiment.

As illustrated in FIG. 7, the joint 650 connects a motor output shaft 24B and the first shaft portion 622, and transmits the power of the electric motor 24 to the worm 620. As illustrated in FIG. 7, the joint 650 includes a first coupling 651 that is attached to the motor output shaft 24B; the second coupling 652 that is attached to the first shaft portion 622; and a bush 653 that is supported by the first coupling 651 and the second coupling 652.

The first coupling 651 is provided with a plurality of (here, four) first engaging claws 651a which are disposed close to the bush 653 and are equally separated from each other in the circumferential direction. The second coupling 652 is provided with a plurality of (here, four) second engaging claws 652a which are disposed close to the bush 653 and are equally separated from each other in the circumferential direction.

The bush 653 is an elastic body made of rubber or the like, and is provided with a plurality of (here, eight) engaging holes 653a which extend in the axial direction and are equally separated from each other in the circumferential direction. In other words, an engaging claw 653*b* is formed between the engaging holes 653*a* which are adjacent to each other in the circumferential direction.

The fitting of the plurality of first engaging claws 651*a* and the fitting of the plurality of second engaging claws 652*a* into the plurality of respective engaging holes 653*a* are done alternately in the circumferential direction. Accordingly, the rotating force (power) of the electric motor 24 is transmitted to the worm 620 via the first coupling 651, the bush 653, and the second coupling 652.

Since the first engaging claw 651*a* and the second engaging claw 652*a* have the engaging claw 653*b* made of rubber interposed therebetween, and are configured not to be in direct contact with each other in the circumferential direction, the occurrence of a tapping sound or circumferential rattling is reduced.

The axial (longitudinal) length of the bush 653 is greater than the axial length of the first engaging claw 651*a* and the axial length of the second engaging claw 652*a*, and the bush 653 is assembled with the first coupling 651 and the second coupling 652 while being slightly compressed in the axial direction. Accordingly, the first coupling 651 and the second coupling 652 can slightly move axially relative to each other.

First Bearing

Figure 5B:
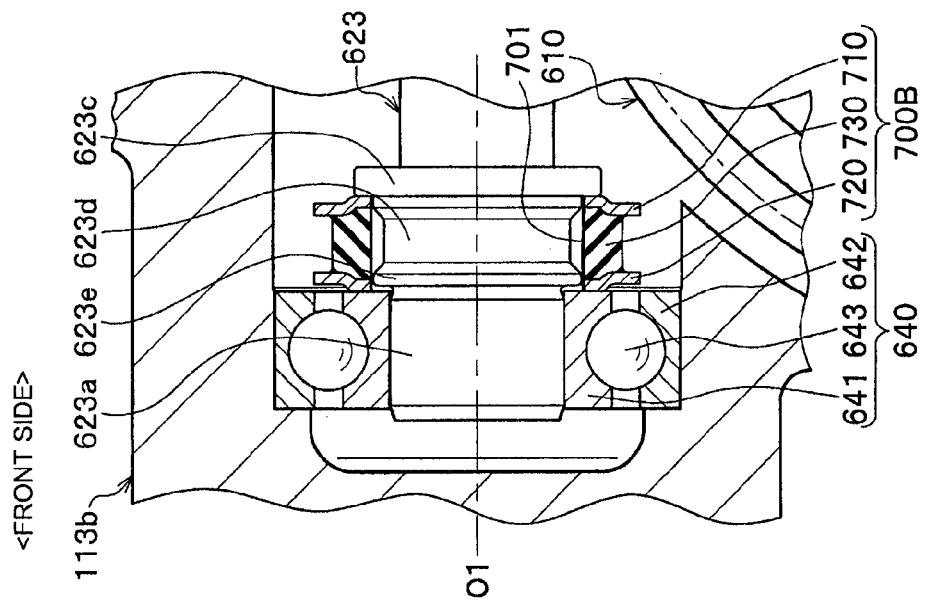
FIG. 5B is a cross-sectional plan view of a front second worm damper.
Figure 5A:
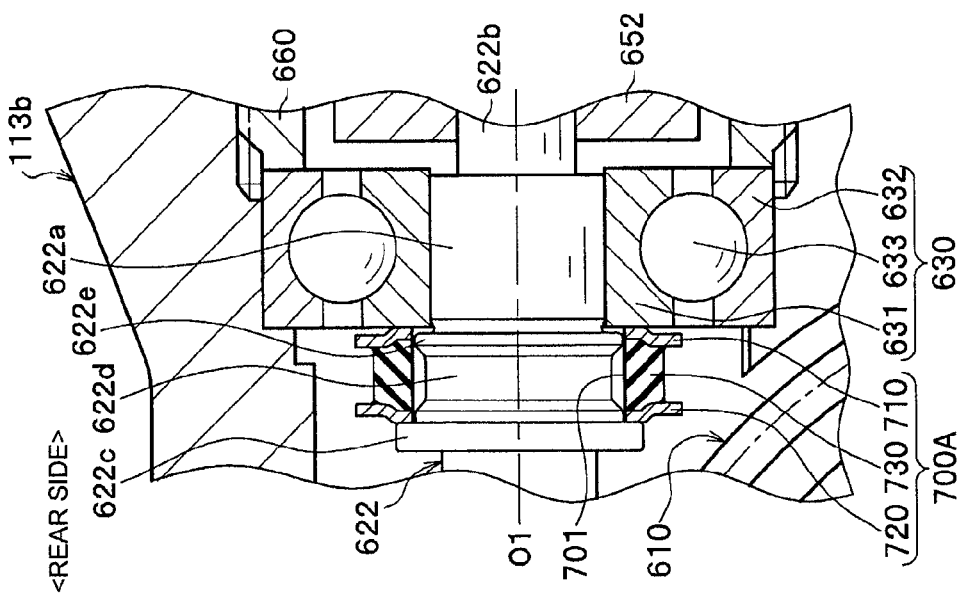
FIG. 5A is a cross-sectional plan view of a rear first worm damper.

As illustrated in FIG. 5A, the first bearing 630 is provided between the first supported portion 622*a* of the worm 620 and the second housing 113*b*, and supports the first supported portion 622*a* so that the first supported portion 622*a* can rotate with respect to the second housing 113*b*. For example, the first bearing 630 is a radial ball bearing assembly, and supports a radial load.

The first bearing 630 includes the first inner ring 631 that is fitted to the outer circumferential surface of the first supported portion 622*a*; a first outer ring 632 that is fitted to the inner circumferential surface of the second housing 113*b*; and first balls 633 that roll along between the first inner ring 631 and the first outer ring 632. That is, the first outer ring 632 is held by the second housing 113*b*. A rear end surface of the first outer ring 632 is in contact with a cylindrical locking member (lock screw) 660 that is screwed into the second housing 113*b*, and thereby the first bearing 630 is held by the second housing 113*b*.

Second Bearing

As illustrated in FIG. 5B, the second bearing 640 is provided between the second supported portion 623*b* of the worm 620 and the second housing 113*b*, and supports the second supported portion 623*b* so that the second supported portion 623*b* can rotate with respect to the second housing 113*b*. That is, a second outer ring 642 is held by the second housing 113*b*. For example, the second bearing 640 is a radial ball bearing assembly, and supports a radial load.

First Worm Damper and Second Worm Damper

As illustrated in FIG. 5A, the first worm damper 700A is elastically deformed, while being disposed at the rear of the worm main body 621 and between the first flange portion 622*c* and the first inner ring 631, and thereby the worm 620 can move rearward in the axial direction. That is, the first worm damper 700A is disposed at an axial inner side (close to the worm main body 621) of the first bearing 630. In other words, the first worm damper 700A is disposed between the worm main body (worm gear teeth) 621 and the first bearing 630.

As illustrated in FIG. 5B, the second worm damper 700B is elastically deformed, while being disposed in front of the worm main body 621 and between the second flange portion 623*c* and the second inner ring 641, and thereby the worm 620 can move forward in the axial direction. That is, the second worm damper 700B is disposed at an axial inner side (close to the worm main body 621) of the second bearing 640. In other words, the second worm damper 700B is disposed between the worm main body (worm gear teeth) 621 and the second bearing 640.

Since the first worm damper 700A and the second worm damper 700B have the same configuration, hereinafter, only the first worm damper 700A will be described. As illustrated in FIGS. 5A and 6, the first worm damper 700A has a ring shape so as to allow the worm 620 to pass therethrough, and the insertion hole 701 is formed in the radial center portion of the first worm damper 700A, and the worm 620 is loosely inserted into the insertion hole 701.

The first worm damper 700A includes a rear first plate 710; the front second plate 720; and the elastic body 730 that is interposed between the first plate 710 and the second plate 720.

Each of the first plate 710 and the second plate 720 is a thin ring-shaped plate. A radial inner portion of the first plate 710 is concave near the rear. Accordingly, the first plate 710 and the elastic body 730 are not out of alignment in the radial direction. Similarly, a radial inner portion of the second plate 720 is concave near the front.

The elastic body 730 is a ring-shaped member made of rubber or the like, which can be elastically deformed. The elastic body 730 is interposed between the first plate 710 and the second plate 720, with an appropriate axial (longitudinal) tightening allowance maintained. The tightening allowance of the elastic body 730 is adjusted by the degree of the screwing of the locking member (lock screw) 660.

As such, the rear first bearing 630 and the front second bearing 640 have the worm 620 interposed therebetween in the axial direction via the rear first worm damper 700A and the front second worm damper 700B, respectively. Since the elastic body 730 (refer to FIG. 5A) of the first worm damper 700A and the elastic body 730 (refer to FIG. 5B) of the second worm damper 700B are elastically deformed, the worm 620 can move in the axial direction.

That is, when a rearward axial force is applied to the worm 620, the worm 620 moves rearward while compressing the elastic body 730 (refer to FIG. 5A) of the first worm damper 700A. In contrast, when a forward axial force is applied to the worm 620, the worm 620 moves forward while compressing the elastic body 730 (refer to FIG. 5B) of the second worm damper 700B. As such, since the worm 620 moves forward or rearward, an appropriate backlash is obtained between the worm 620 and the worm wheel 610.

In the motor-driven power steering apparatus 101 with the above-mentioned configuration, when the torque sensor 23 detects a steering torque applied to the handlebars 2, the ECU controls the electric motor 24 based on a detection signal from the torque sensor 23. The generated torque of the electric motor 24 is transmitted to the output shaft 22 via the worm 620 and the worm wheel 610. Accordingly, the generated torque of the electric motor 24 is transmitted to the output shaft 22 as an assist force for a steering force applied by a driver on the handlebars 2.

The arm stopper mechanism 160 includes the steering arm 161 and a stopper 162. The arm stopper mechanism 160 is a mechanism that restricts the turning angle of the steering arm 161 using the stopper 162. The steering arm 161 is a steering member of the wheels (the front wheels) 9. The tie rods 8 are attached to the steering arm 161, and the wheels 9 are respectively connected to the tie rods 8. The tie rod 8 is disposed in a state where the tie rod 8 extends in a lateral direction of the vehicle. One end of the tie rod 8 is connected to the steering arm 161 in the vicinity of the center of the vehicle in the lateral direction, and the other end is connected to the wheel (the front wheel) 9. The steering arm 161 is spline-fitted to the output shaft 22, and is configured to turn about the output shaft 22.

When the driver turns the handlebars 2 to the maximum steering angle or greater in a clockwise direction or a counter-clockwise direction, or when the handlebars 2 turn to the maximum steering angle or greater due to an external force that is input from a protrusion (convex portion) or the like on a road surface to the motor-driven power steering apparatus 101 via the wheels (front wheels) 9 while the vehicle is travelling on a rough road, the motor-driven power steering apparatus 101 is required to restrict the turning of the handlebars 2 in such a manner that the vehicle does not roll over in the lateral direction. The motor-driven power steering apparatus 101 includes the arm stopper mechanism 160 as a mechanism for such a function.

The stopper 162 protrudes downward from a lower surface of the housing 113 while being integrally fixed to the housing 113 (the third housing 113c) of the motor-driven power steering apparatus 101, and is provided in the vicinity of the output shaft 22. In the arm stopper mechanism 160, when the driver turns the handlebars 2 to the maximum steering angle or greater in the clockwise direction or the counter-clockwise direction, or when the handlebars 2 turn to the maximum steering angle or greater due to an external force that is input via the wheels (front wheels) 9, a striking surface 176 (refer to FIG. 12A) of the steering arm 161 strikes against a contact surface 186a (refer to FIG. 13A) of the stopper 162. Accordingly, the arm stopper mechanism 160 restricts the turning angle of the steering arm 161 using the stopper 162, and thus the turning of the handlebars 2 is restricted.

2: Schematic Configuration Between Steering Arm and Wheels (Front Wheels)

Figure 8:
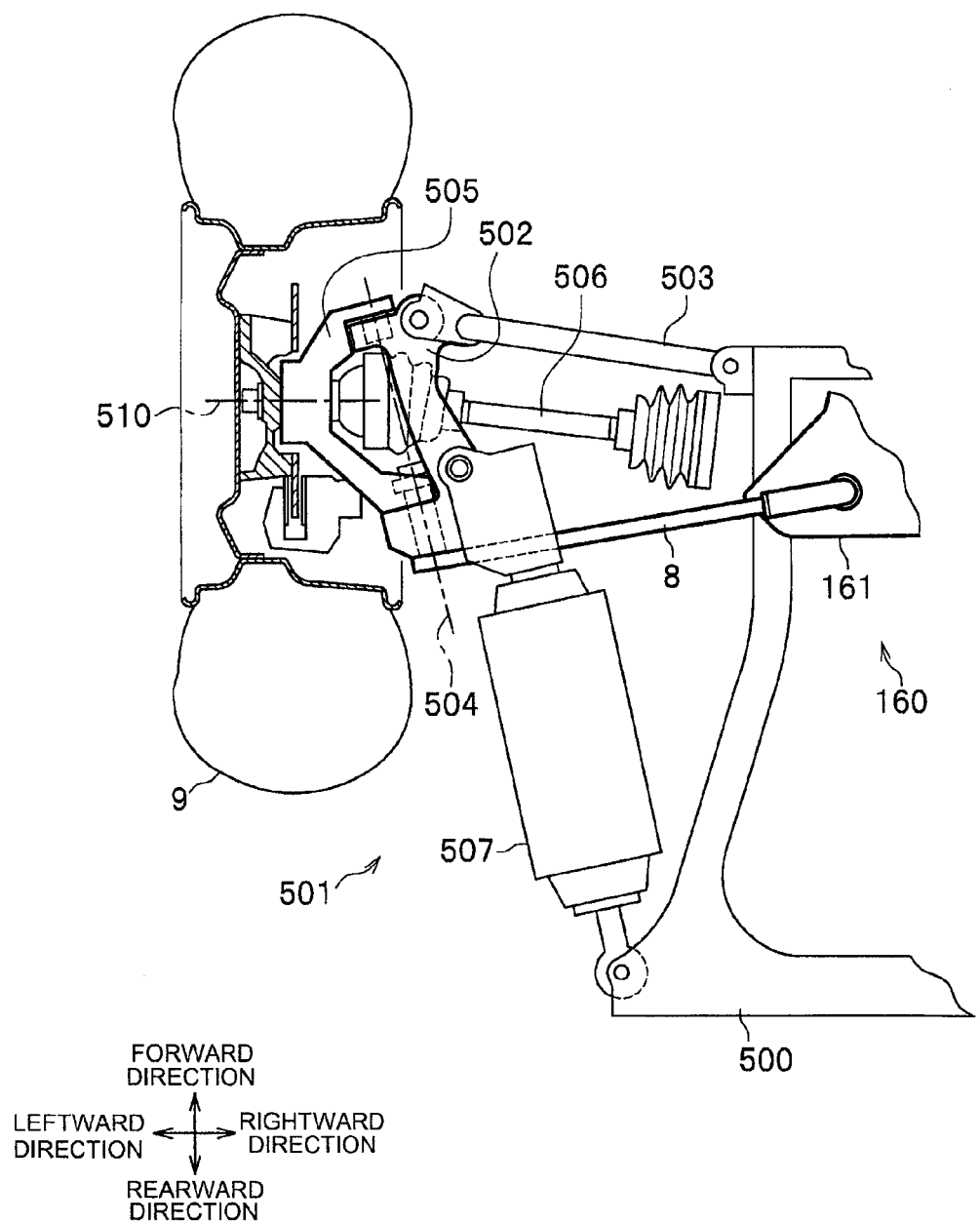
FIG. 8 is a schematic top view illustrating the configuration between a steering arm of the arm stopper mechanism according to the first embodiment and front wheels.

Subsequently, the schematic configuration between the steering arm 161 and the wheels (the front wheels) 9 will be described with reference to FIG. 8. FIG. 8 is a schematic top view illustrating the configuration between the steering arm 161 of the arm stopper mechanism 160 according to the first embodiment and the wheels (front wheels) 9.

As illustrated in FIG. 8, the wheels (the front wheels) 9 are suspended from a vehicle body 500 via a front wheel suspension apparatus 501. The front suspension apparatus 501 includes a front cushion 507, an upper end of which is connected to the vehicle body 500 and which extends downward; a knuckle support member 502 that extends downward from a lower portion of the front cushion 507; a lower arm 503 that connects a lower portion of the knuckle support member 502, which extends in the lateral direction of the vehicle, to the vehicle body 500; a knuckle 505 that is attached to the knuckle support member 502 so as to be turnable about a kingpin axis line 504, and supports the wheel (front wheel) 9; and the tie rod 8 that turns the knuckle 505, which extends in the lateral direction of the vehicle, about the kingpin axis line 504. The knuckle 505 is provided with a hole through which a drive shaft 506 passes. The drive shaft 506 drives the wheels (the front wheels) 9 which rotate about a vehicle axis 510.

Subsequently, an operational relationship between the steering arm 161 and the wheels (the front wheels) 9 will be described with reference to FIGS. 9A and 9B. FIGS. 9A and 9B are schematic bottom views illustrating the operational relationship between the steering arm 161 of the arm stopper mechanism 160 according to the first embodiment and the front wheels 9.

FIG. 9A illustrates a state in which the handlebars 2 are not turned (that is, a state in which the handlebars 2 are maintained in a neutral state, and the saddle-type vehicle 100 moves straight). In contrast, FIG. 9B illustrates a state in which the handlebars 2 are turned to the maximum steering angle in the counter-clockwise direction (that is, a state in which the saddle-type vehicle 100 is turned left to the maximum).

As apparent from the difference between FIGS. 9A and 9B, when the handlebars 2 are turned to the maximum steering angle in the counter-clockwise direction (refer to FIG. 9B), the steering arm 161 turns about the output shaft 22 in the counter-clockwise direction. At this time, the right wheel (the right front wheel) 9 is pushed toward the left via the right tie rod 8, and the left wheel (the left front wheel) 9 is pulled toward the left via the left tie rod 8. As a result, two wheels (front wheels) 9 are oriented toward the left. At this time, a right striking portion 174b of the steering arm 161 collides with a right contact portion 186b of the stopper 162 (refer to FIGS. 11 and 15).

In contrast, when the handlebars 2 are turned to the maximum steering angle in the clockwise direction, the steering arm 161 turns about the output shaft 22 in the clockwise direction. At this time, the right wheel (the right front wheel) 9 is pushed toward the right via the right tie rod 8, and the left wheel (the left front wheel) 9 is pulled toward the right via the left tie rod 8. As a result, the two wheels (front wheels) 9 are oriented toward the rightward direction. At this time, a left striking portion 174a of the steering arm 161 collides with a left contact portion 186a of the stopper 162.

3: Load Vectors Applied to Steering Arm

In the saddle-type vehicle 100, in a state where the striking portion 174 of the steering arm 161 collides with the contact portion 186 of the stopper 162 (refer to FIG. 9B), an input load may be input to the steering arm 161 from the outside (refer to FIG. 10).

For example, in a case where the saddle-type vehicle 100 is equipped, not with the motor-driven power steering apparatus 101 that is provided with the arm stopper mechanism 160 according to the first embodiment, but with a motor-driven power steering apparatus 1 (refer to FIGS. 20 and 21) that is provided with an arm stopper mechanism 60 according to the comparative example which will be described later, since in designing the configuration of the arm stopper mechanism 60 according to the comparative example, a feature for reducing the value of a bending load vector Wt applied to the output shaft 22 (refer to Section 5: Relationship between Input Load Vector and Striking Load Vector, and Bending Load Vector, which will be described later) is not taken into consideration, a relatively large bending load may be applied to the output shaft 22. As a result, at this time, an excessive load may be applied to the bearings 32A and 32B (refer to FIG. 3) that support the output shaft 22; the bearing 31 (refer to FIG. 3) that supports the input shaft 21 which is connected to the output shaft 22 via the torsion bar 27; and the housing 113 (refer to FIG. 3) in the vicinity of the bearings 32A, 32B and 31.

Hereinafter, load vectors applied to the steering arm 161 will be described with reference to FIG. 10. FIG. 10 is a view illustrating the load vectors applied to the steering arm 161. FIG. 10 illustrates the saddle-type vehicle 100 in the following state.

That is, when the saddle-type vehicle 100 is traveling on a rough road, the saddle-type vehicle 100 may move upward and downward severely, and in some cases, the wheels (the front wheels) 9 may leap upward from (separate from) a road surface. For example, as illustrated in FIG. 10, if the driver turns the handlebars 2 to the maximum steering angle in the counter-clockwise direction right before or right after the wheels (the front wheels) 9 leap upward from a road surface, a side surface of each of the right and left wheels (the right and left front wheels) 9 lands on the road surface, prior to other portions of the wheels. At this time, for example, when the rear of the side surface of the left wheel (the left front wheel) 9 collides with a hard protrusion 511 such as a stone, the left wheel (the left front wheel) 9 receives a strong reaction force from the protrusion 511. FIG. 10 illustrates the state of the saddle-type vehicle 100 at this time.

At this time, the strong reaction force is input as an input load vector Wh to a left tie rod hole 172 (refer to FIGS. 11 and 12A) of the steering arm 161 via the left wheel (the left front wheel) 9 and the left tie rod 8.

At this time, since the right striking portion 174b of the steering arm 161 collides with the right contact portion 186b of the stopper 162, a striking load vector Wb perpendicular to the right contact portion 186b is input to the right striking portion 174b from the right contact portion 186b.

In a state where the striking portion 174 of the steering arm 161 has not collided with the contact portion 186 of the stopper 162, when the striking portion 174 of the steering arm 161 collides with the contact portion 186 of the stopper 162 due to the collision of the wheel (the front wheel) 9 with the protrusion 511, the application of the load vectors to the steering arm 161 is similar to the case illustrated in FIG. 10.

When the driver turns the handlebars 2 to the maximum steering angle in the clockwise direction right before or right after the wheels (the front wheels) 9 leap upward from a road surface, the input of the input load vector Wh and the striking load vector Wb is laterally reverse to the case illustrated in FIG. 10. That is, the input load vector Wh is input to a right tie rod hole 172 (refer to FIGS. 11 and 12A) of the steering arm 161, and in contrast, the striking load vector Wb is input to the left striking portion 174a from the left contact portion 186a.

4-1: Configuration of Arm Stopper Mechanism According to Comparative Example

Figure 20:
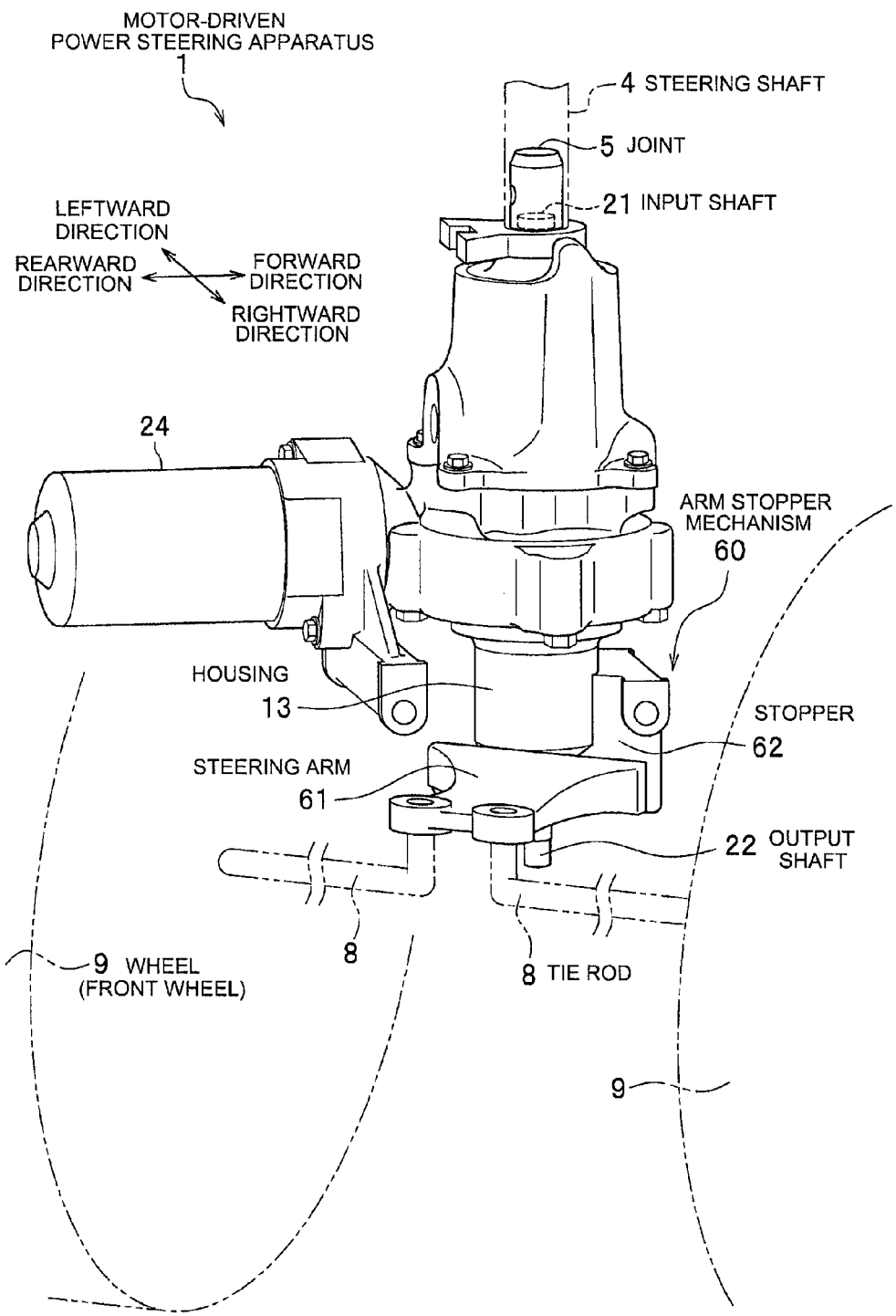
FIG. 20 is a schematic side view illustrating the configuration of a motor-driven power steering apparatus with an arm stopper mechanism according to a comparative example.
Figure 21:
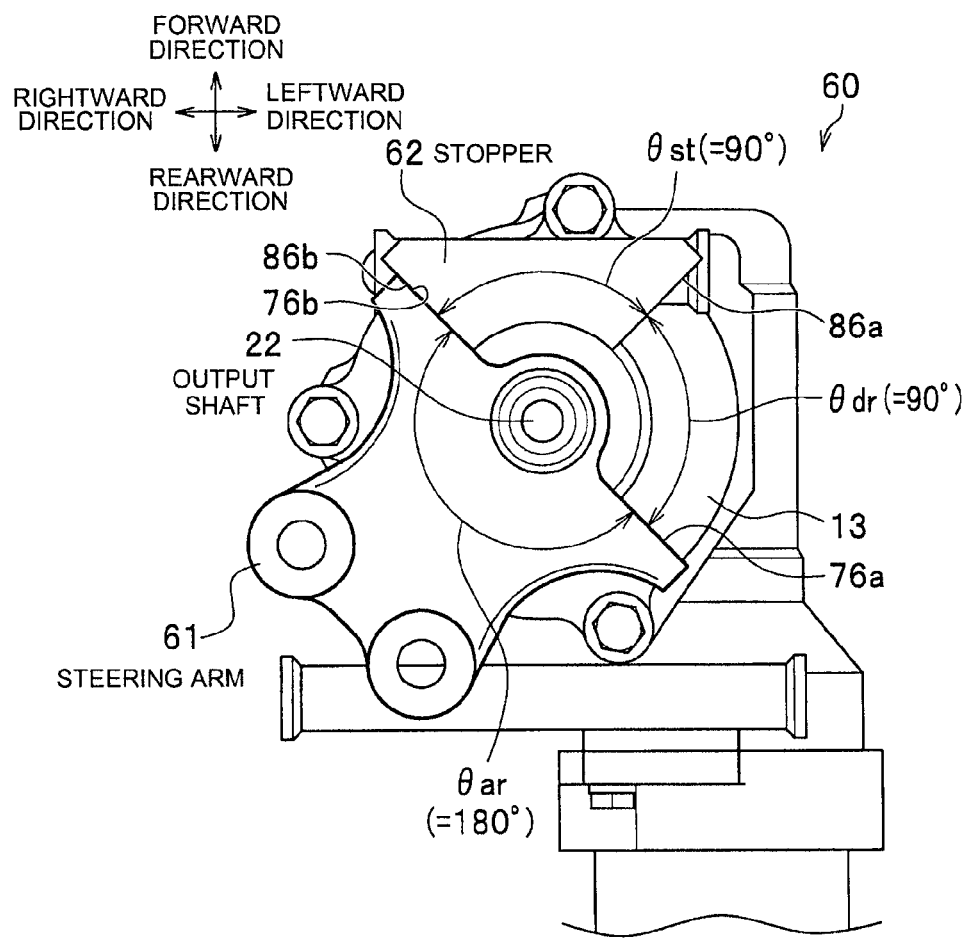
FIG. 21 is a schematic bottom view illustrating the configuration of the arm stopper mechanism according to the comparative example.
Figures 22A, 22B:
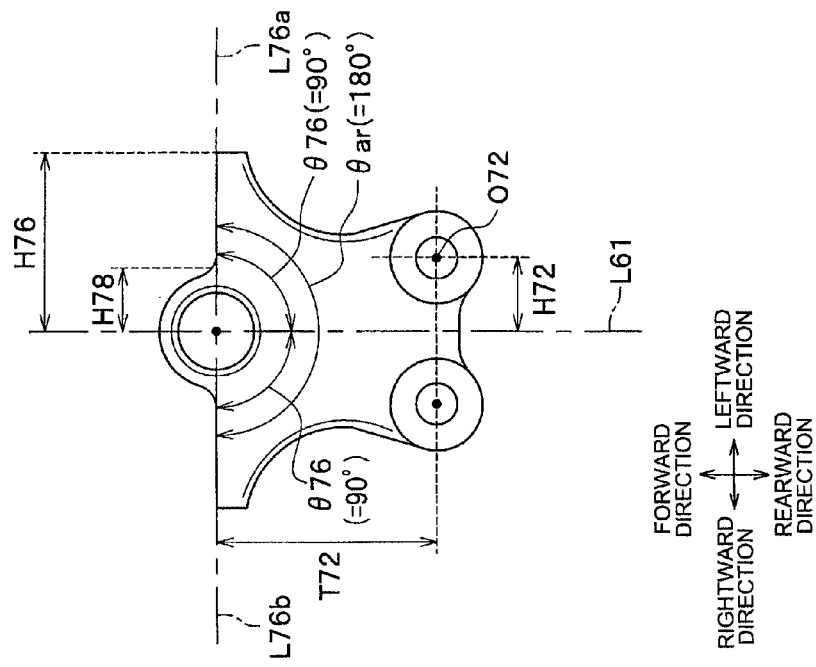
FIGS. 22A and 22B are schematic bottom views illustrating the configuration of a steering arm of the arm stopper mechanism according to the comparative example.
Figure 23A:
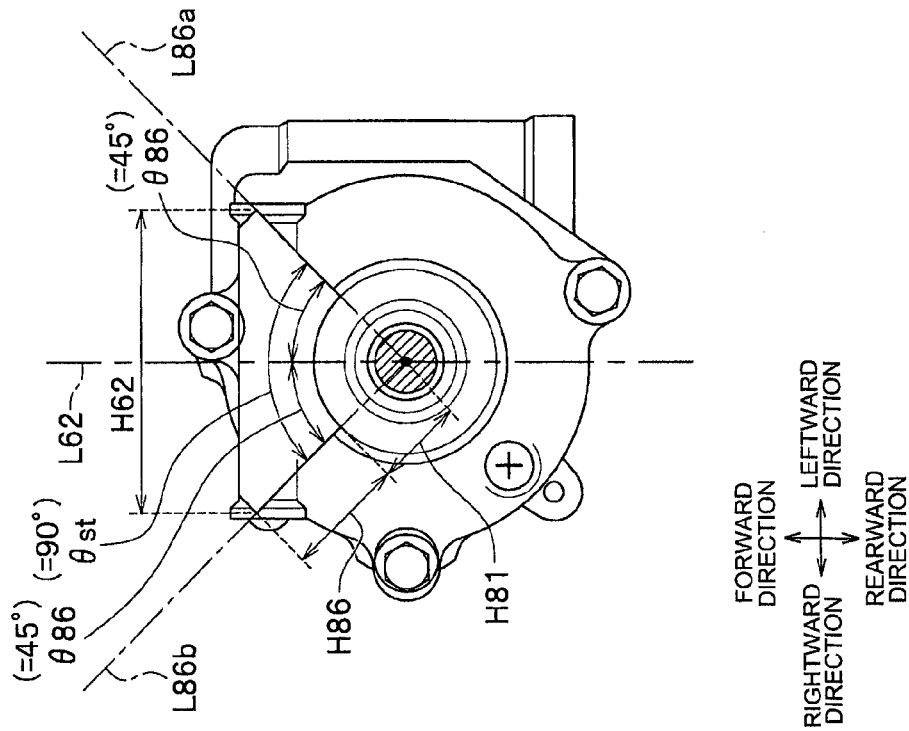
FIGS. 23A and 23B are schematic bottom views illustrating the configuration of a stopper of the arm stopper mechanism according to the comparative example.
Figure 23B:
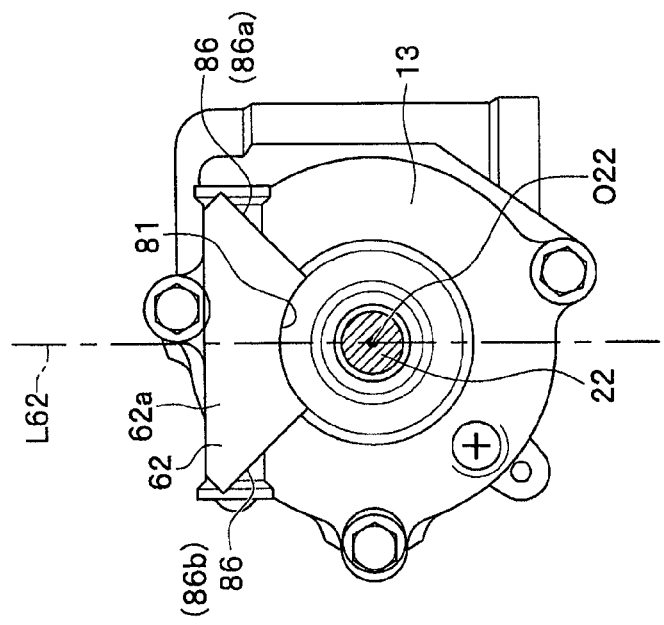

Subsequently, the configuration of the arm stopper mechanism 60 according to the comparative example will be described with reference to FIGS. 20 to 23B for easy understanding of the characteristics of the arm stopper mechanism 160 according to the first embodiment. FIG. 20 is a schematic side view illustrating the configuration of the motor-driven power steering apparatus 1 with the arm stopper mechanism 60 according to the comparative example. FIG. 21 is a schematic bottom view illustrating the configuration of the arm stopper mechanism 60. FIGS. 22A and 22B are schematic bottom views illustrating the configuration of a steering arm 61 of the arm stopper mechanism 60. FIGS. 23A and 23B are schematic bottom views illustrating the configuration of a stopper 62 of the arm stopper mechanism 60.

The motor-driven power steering apparatus 1 according to the comparative example illustrated in FIG. 20 is the same apparatus as the motor-driven power steering apparatus 101 according to the first embodiment. Instead of the arm stopper mechanism 160 according to the first embodiment, the arm stopper mechanism 60 according to the comparative example is provided near a lower surface of a housing 13.

FIG. 21 is a bottom view illustrating the configuration of the arm stopper mechanism 60. As illustrated in FIG. 21, the arm stopper mechanism 60 includes the steering arm 61 that turns about the input shaft 22.

In the arm stopper mechanism 60 illustrated in FIG. 21, an angle Oar made by striking surfaces 76a and 76b (refer to FIGS. 22A and 22B) of the steering arm 61 is set to be 180°. An angle θst made by the contact surfaces 86a and 86b (refer to FIGS. 23A and 23B) of the stopper 62 (angle between two contact surfaces 86a and 86b, and an angle formed in the stopper 62) is set to be 90°. A total angle θdr is the sum of the maximum clockwise steering angle and the maximum counter-clockwise angle of the steering arm 61, and is set to be 90° (that is, the maximum clockwise steering angle is 45°, and the maximum counter-clockwise steering angle is 45°).

FIGS. 22A and 22B illustrate the specific configuration of the steering arm 61. FIG. 22A illustrates the configuration of portions of the steering arm 61, and FIG. 22B illustrates the disposition position of each portion of the steering arm 61.

As illustrated in FIG. 20, the entirety of a portion (hereinafter, refer to as a "main body") of the steering arm 61 has a plate shape, and the tie rods 8 are attached to the portion. As illustrated in FIGS. 22A and 22B, the steering arm 61 is provided with one output shaft hole 71 and two tie rod holes 72a and 72b. The output shaft hole 71 is a circular hole into which the output shaft 22 is fitted. The tie rod holes 72a and 72b are circular holes to which the tie rods 8 are respectively attached. Hereinafter, the tie rod holes 72a and 72b are referred to as a "tie rod hole 72" as a generic term.

The output shaft 22 is fitted into the output shaft hole 71, and thereby the center point of the output shaft hole 71 coincides with a center point O22 of the output shaft 22. Hereinafter, the center point of the output shaft hole 71 may refer to the "center point O22".

The tie rod holes 72a and 72b are respectively disposed at positions which are equally separated from a center line L61 of the steering arm 61 to the left and the right. In the example illustrated in FIGS. 22A and 22B, a center point O72 of each of the tie rod holes 72a and 72b is disposed at a position which is separated by a distance of T72 from the center point O22 of the output shaft hole 71 to the rear, and which is separated by a distance of H72 from the center line L61 of the steering arm 61 to the right or the left.

Here, the "center line L61 of the steering arm 61" is an imaginary straight line that passes through the center point O22 of the output shaft hole 71 and extends in a longitudinal direction of the vehicle. When the steering angle of the handlebars 2 is 0° in a neutral state, the "center line L61 of the steering arm 61" coincides with a "center line L62 (refer to FIGS. 23A and 23B) of the stopper 62" which will be described later. The "center line L62 of the stopper 62" is an imaginary straight line (hereinafter, referred to as a "center line of the entirety of the vehicle") that passes through the center point of the vehicle in the lateral direction and extends in the longitudinal direction of the vehicle.

The steering arm 61 includes portions (hereinafter, referred to as "striking portions") 74a and 74b which strike against the stopper 62. The striking portions 74a and 74b are respectively provided in the vicinities of opposite sides of the output shaft hole 71 of the main body (portion to which the tie rods 8 are attached) of the plate-shaped steering arm 61. The end surfaces of the striking portions 74a and 74b are respectively made as flat surfaces (hereinafter, referred to as "striking surfaces") 76a and 76b. Hereinafter, the striking portions 74a and 74b are referred to as a "striking portion 74" as a general term. The striking surfaces 76a and 76b are referred to as a "striking surface 76" as a general term.

In the steering arm 61, an angle θ76 made by the center line L61 of the steering arm 61 and the striking surface 76 is set to be 90°. Accordingly, the angle Oar made by the striking surfaces 76a and 76b (angle between two striking surfaces 76a and 76b, and an angle formed in the steering arm 61) is set to be 180°.

In FIGS. 22A and 22B, a line L76a is an imaginary straight line that is disposed along the striking surface 76a. A line L76b is an imaginary straight line that is disposed along the striking surface 76b. The lines L76a and L76b intersect at the center point O22 of the output shaft hole 71. A length H76 is the distance from the center point O22 of the output shaft hole 71 to an end portion of the striking surface 76 in the steering arm 61.

The steering arm 61 includes a circular arc portion 78 that surrounds the output shaft hole 71, and the surrounding shape of the circular arc portion 78 is a circular arc shape. The circular arc portion 78 is formed to be continuous with the striking portions 74a and 74b. In FIGS. 22A and 22B, a length H78 is the distance from the center point O22 of the output shaft hole 71 to an end portion of the circular arc portion 78 in the steering arm 61.

FIGS. 23A and 23B illustrate the specific configuration of the stopper 62. FIG. 23A illustrates the configuration of portions of the stopper 62, and FIG. 23B illustrates the disposition position of each portion of the stopper 62.

As illustrated in FIG. 20, the stopper 62 is provided to protrude downward from the lower surface of the housing 13 of the motor-driven power steering apparatus 1. As illustrated in FIGS. 23A and 23B, when seen from below, the shape of the stopper 62 is made by forming a flabellate cut-away portion 81 (refer to FIG. 23A) having a radius of H81 in an apex portion of an isosceles triangle that has the center point O22 of the output shaft 22 as an apex, a bottom side having a length of H62, and an oblique side having a length of (H81+H86), and thereby the stopper 62 is bilaterally symmetrical with respect to the center line L62 thereof.

In the description herein, the "center line L62 of the stopper 62" is an imaginary straight line that passes through the center point O22 of the output shaft 22 and extends in the longitudinal direction. The "center line L62 of the stopper 62" is the center line of the entirety of the vehicle.

The stopper 62 includes two flat surfaces 86a and 86b that are respectively positioned on the oblique lines of the isosceles triangles, and the flat surfaces 86a and 86b function as contact surfaces that are brought into contact with the striking surfaces 76a and 76b of the steering arm 61, respectively. Hereinafter, the flat surface 86a is referred to as the "contact surface 86a", and the flat surface 86b is referred to as the "contact surface 86b". The contact surfaces 86a and 86b are referred to as the "contact surface 86" as a generic term.

An angle θ86 made by the center line L62 of the stopper 62 and the contact surface 86 is set to be 45°. Accordingly, the angle θst made by the contact surfaces 86a and 86b (angle between two contact surfaces 86a and 86b, and an angle formed in the stopper 62) is set to be 90°.

In FIGS. 23A and 23B, a line L86a is an imaginary straight line that is disposed along the contact surface 86a. A line L86b is an imaginary straight line that is disposed along the contact surface 86b. The lines L86a and L86b intersect at the center point O22 of the output shaft 22.

Figure 24:
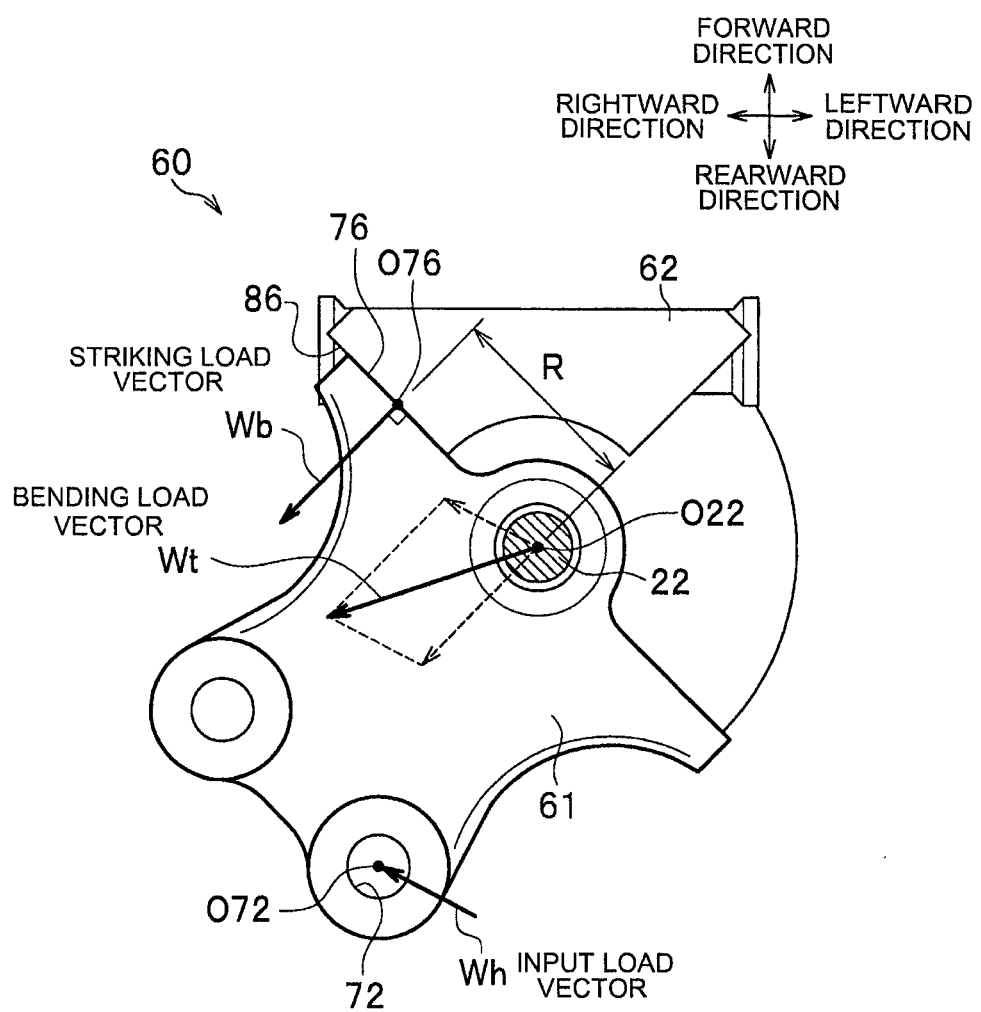
FIG. 24 is a view illustrating load vectors applied to main portions of the arm stopper mechanism according to the comparative example.

4-2: Load Vectors Applied to Main Portions of Arm Stopper Mechanism According to Comparative Example Subsequently, load vectors applied to main portions of the arm stopper mechanism 60 according to the comparative example will be described with reference to FIG. 24. FIG. 24 is a view illustrating the load vectors applied to the main portions of the arm stopper mechanism 60.

In the description herein, the "input load vector Wh" refers to a load vector that is input to the steering arm 61 from the wheel 9 (refer to FIG. 20) via the tie rod hole 72, the "striking load vector Wb" refers to a load vector that is applied to the striking surface 76 of the steering arm 61 from the contact surface 86 of the stopper 62, and the "bending load vector Wt" refers to a load vector that is applied to the output shaft 22 fitted into the output shaft hole 71 (refer to FIG. 22A).

In the description herein, a "striking center position O76" refers to a center position of a contact portion between the striking surface 76 of the steering arm 61 and the contact surface 86 of the stopper 62, and the striking load vector Wb is applied to the striking center position O76. In the example illustrated in FIG. 24, the striking center position O76 is set to a position that is separated by a distance of R from the center point O22 of the output shaft 22.

The description herein will be given based on an assumption that the handlebars 2 are turned to the maximum steering angle in the counter-clockwise direction so as to turn the travelling saddle-type vehicle 100 to the left to the maximum, as illustrated in FIG. 24, thereby the right striking surface 76b of the steering arm 61 striking the right contact surface 86b of the stopper 62, and the rear of the side surface of the left wheel (the left front wheel) 9 colliding with the protrusion 511 (refer to FIG. 10). At this time, according to the principle described in Section 3: Load Vectors Applied to Steering Arm, as illustrated in FIG. 24, in the arm stopper mechanism 60, the input load vector Wh is applied to the surroundings of the left tie rod hole 72, and the striking load vector Wb is applied to the striking center position O76. The bending load vector Wt, which is a combined vector of the input load vector Wh and the striking load vector Wb, is applied to the output shaft 22.

When the value of the bending load vector Wt increases, an excessive load may be applied to the bearings 32A and 32B (refer to FIG. 3) which support the output shaft 22; the bearing 31 (refer to FIG. 3) that supports the input shaft 21 which is connected to the output shaft 22 via the torsion bar 27; and the housing 113 (refer to FIG. 3) in the vicinity of the bearings 32A, 32B, and 31. The output shaft 22 is connected to the handlebars 2 via the torsion bar 27, the input shaft 21, and the steering shaft 4. For this reason, when the value of the bending load vector Wt increases, a bending load as a strong reaction force propagates to the handlebars 2, and thereby the control of the handlebars 2 becomes difficult.

In this configuration, the value of the bending load vector Wt is the value of a combined vector of the input load vector Wh and the striking load vector Wb. When the striking surface 76 of the steering arm 61 is in contact with the contact surface 86 of the stopper 62, the direction of the input load vector Wh is determined by a direction in which the tie rod 8 (refer to FIG. 20) is attached to the tie rod hole 72. The direction of the striking load vector Wb is perpendicular to the striking surface 76 of the steering arm 61.

Figure 25C:
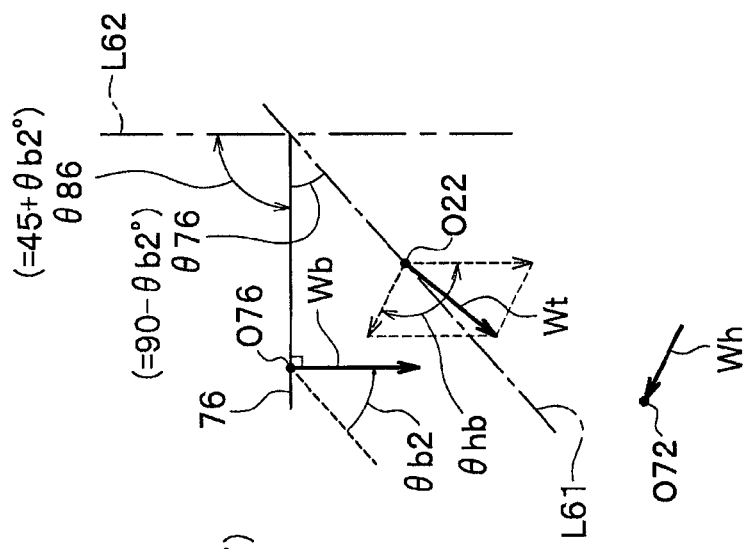
FIGS. 25A, 25B and 25C are schematic views illustrating the relationship between an input load vector and a striking load vector, and a bending load vector.
Figure 25B:
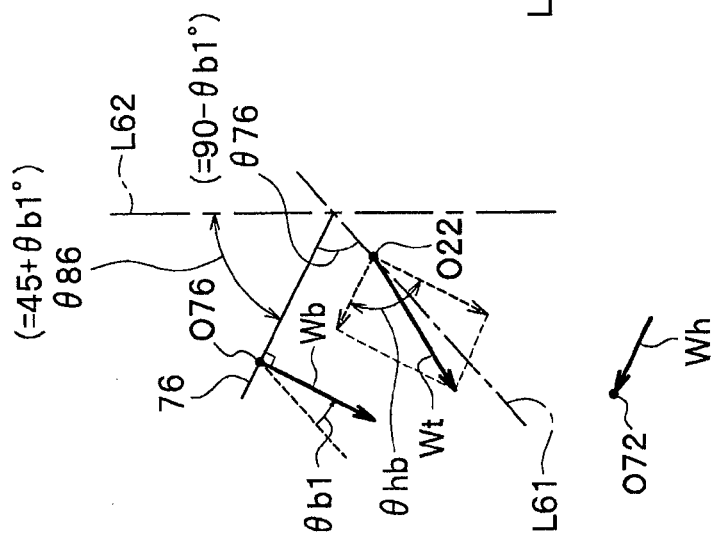
Figure 25A:
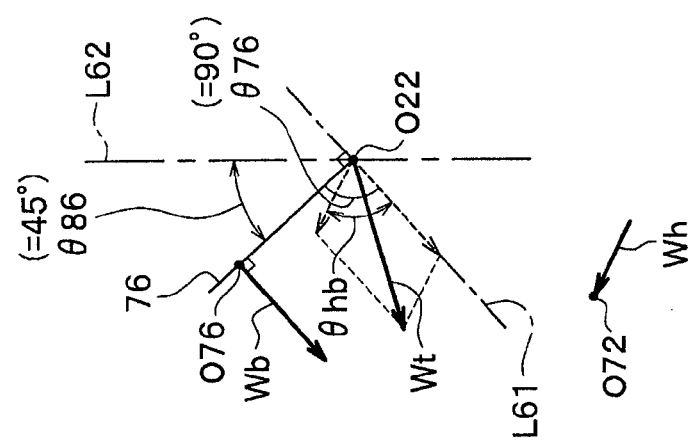

5: Relationship Between Input Load Vector and Striking Load Vector, and Bending Load Vector Subsequently, a relationship between the input load vector Wh and the striking load vector Wb, and the bending load vector Wt will be described with reference to FIGS. 24 and 25A to 25C. FIGS. 25A to 25C are schematic views illustrating the relationship between the input load vector Wh and the striking load vector Wb, and the bending load vector Wt, FIG. 25A is a schematic view for the comparative example illustrated in FIG. 24, and FIGS. 25B and 25C are schematic views for other review examples. The description herein will be given based on an assumption that as illustrated in FIG. 24, the right striking surface 76b of the steering arm 61 strikes against the right contact surface 86b of the stopper 62.

FIGS. 25A to 25C illustrate how the value of the bending load vector Wt changes in a case where as illustrated in FIG. 24, the right striking surface 76b of the steering arm 61 strikes against the right contact surface 86b of the stopper 62, and the disposition direction of each of the striking surface 76 of the steering arm 61 and the contact surface 86 of the stopper 62 is changed. In FIGS. 25A to 25C, a positional relationship between the center point O72 of the tie rod hole 72, the striking center position O76, and the center point O22 of the output shaft 22 is as illustrated in FIG. 24.

FIG. 25A illustrates a state where the disposition direction of each of the striking surface 76 of the steering arm 61 and the contact surface 86 of the stopper 62 illustrated in FIG. 24 is not changed. That is, in the example illustrated in FIG. 25A, the angle θ76 made by the center line L61 and the striking surface 76 in the steering arm 61 is set to be 90°. In other words, in the example illustrated in FIG. 25A, the angle θ86 made by the center line L62 and the contact surface 86 in the stopper 62 is set to be 45°.

In the example illustrated in FIG. 25B, the disposition direction of the striking surface 76 of the steering arm 61 is tilted by an angle of θb1 from the state illustrated in FIG. 25A toward the center line L61 in such a manner that the direction of the input load vector Wh is perpendicular to the direction of the striking load vector Wb. That is, in the example illustrated in FIG. 25B, the angle θ76 made by the center line L61 and the striking surface 76 in the steering arm 61 is set to an angle of (90−θb1)° that is less than 90°. In other words, in the example illustrated in FIG. 25B, the angle θ86 made by the center line L62 and the contact surface 86 in the stopper 62 is set to an angle of (45+θb1)° that is greater than 45°.

In the example illustrated in FIG. 25C, the disposition direction of the striking surface 76 of the steering arm 61 is tilted by an angle of θb2 (here, the angle θb2>the angle θb1) from the state illustrated in FIG. 25A toward the center line L61. That is, in the example illustrated in FIG. 25C, the angle θ76 made by the center line L61 and the striking surface 76 in the steering arm 61 is set to an angle of (90−θb2)° that is smaller than the angle of (90−θb1)° in the state in FIG. 25B. In other words, in the example illustrated in FIG. 25C, the angle θ86 made by the center line L62 and the contact surface 86 in the stopper 62 is set to an angle of (45+θb2)° that is greater than the angle of (45+θb1)°.

A described above, the value of the bending load vector Wt is the value of a combined vector of the input load vector Wh and the striking load vector Wb. For this reason, if it is assumed that the steering arm 61 collides with the stopper 62, and the attachment direction of the tie rod 8 remains the same with respect to the steering arm 61, in other words, if it is assumed that the direction of the input load vector Wh, that is, the attachment direction of the tie rod 8 remains the same, the value of the bending load vector Wt tends to increase as an angle θhb made by the respective directions of the input load vector Wh and the striking load vector Wb decreases. In contrast, the value of the bending load vector Wt tends to decrease as the angle θhb made by the respective directions of the input load vector Wh and the striking load vector Wb increases.

In the example illustrated in FIG. 25A, the angle θhb made by the respective directions of the input load vector Wh and the striking load vector Wb is an acute angle (angle of 0° or greater and less than 90°). In the example illustrated in FIG. 25B, the angle θhb made by the respective directions of the input load vector Wh and the striking load vector Wb is a right angle (90°). In the example illustrated in FIG. 25C, the angle θhb made by the respective directions of the input load vector Wh and the striking load vector Wb is an obtuse angle of (90° to 180°).

For this reason, in the example illustrated in FIG. 25A, the value of the bending load vector Wt becomes greater than the value (value of the bending load vector Wt in the state illustrated in FIG. 25B) of a combined vector of the input load vector Wh and the striking load vector Wb which are orthogonal to each other. In contrast, in the example illustrated in FIG. 25C, the value of the bending load vector Wt becomes less than the value (value of the bending load vector Wt in the state illustrated in FIG. 25B) of a combined vector of the input load vector Wh and the striking load vector Wb which are orthogonal to each other.

Accordingly, as illustrated in FIG. 25C, in the arm stopper mechanism 60, the input load vector Wh and the striking load vector Wb are applied to cancel each other out by increasing the angle θhb which is made by the respective directions of the input load vector Wh and the striking load vector Wb, and thereby it is possible to reduce the value of the bending load vector Wt applied to the output shaft 22.

Here, as described above, FIG. 25A illustrates the example in which the angle θ76 made by the center line L61 and the striking surface 76 in the steering arm 61 is set to be 90°, that is, the example in which the angle θ86 made by the center line L62 and the contact surface 86 in the stopper 62 is set to be 45°.

FIG. 25B illustrates the example in which the angle θ76 made by the center line L61 and the striking surface 76 in the steering arm 61 is set to be the angle of (90−θb1)° which is less than 90°, that is, the example in which the angle θ86 made by the center line L62 and the contact surface 86 in the stopper 62 is set to be the angle of (45+θb1)° which is greater than 45°.

FIG. 25C illustrates the example in which the angle θ76 made by the center line L61 and the striking surface 76 in the steering arm 61 is set to be the angle of (90−θb2)° which is much smaller than the angle of (90−θb1)°, that is, the example in which the angle θ86 made by the center line L62 and the striking surface 86 in the stopper 62 is set to be the angle of (45+θb2)° which is much greater than the angle of (45+θb1)°.

Accordingly, as can be understood from the relationship illustrated in FIGS. 25A to 25C, as the angle θ76 made by the center line L61 and the striking surface 76 decreases, or the angle θ86 made by the center line L62 and the contact surface 86 in the stopper 62 increases, the angle θhb made by the respective directions of the input load vector Wh and the striking load vector Wb increases.

For this reason, in the arm stopper mechanism 60, it is possible to increase the angle θhb made by the respective directions of the input load vector Wh and the striking load vector Wb, by decreasing the angle θ76 made by the center line L61 and the striking surface 76 in the steering arm 61 (that is, by increasing the angle θ86 made by the center line L62 and the contact surface 86 in of the stopper 62). Accordingly, in the arm stopper mechanism 60, the input load vector Wh and the striking load vector Wb can be applied to cancel each other out, and thereby it is possible to reduce the value of the bending load vector Wt applied to the output shaft 22.

In designing the configuration of the arm stopper mechanism 60 according to the comparative example, the following point is not taken into consideration: the input load vector Wh and the striking load vector Wb are applied to cancel each other out so as to reduce the value of the bending load vector Wt applied to the output shaft 22. For this reason, in the arm stopper mechanism 60, a relatively large bending load may be applied to the output shaft 22, and at this time, an excessive load may be applied to the bearings 32A and 32B (refer to FIG. 3) which support the output shaft 22; the bearing 31 (refer to FIG. 3) that supports the input shaft 21 which is connected to the output shaft 22 via the torsion bar 27; and the housing 113 (refer to FIG. 3) in the vicinity of the bearings 32A, 32B, and 31. At this time, a bending load as a strong reaction force propagates to the handlebars 2, and thereby the control of the handlebars 2 becomes difficult.

6-1: Configuration of Arm Stopper Mechanism According to First Embodiment

In this regard, as in the arm stopper mechanism of the review example illustrated in FIG. 25C, in the configuration of the arm stopper mechanism 160 (refer to FIGS. 2 and 11) according to the first embodiment, the angle θhb (refer to FIG. 15) made by the respective directions of the input load vector Wh and the striking load vector Wb is set to be greater than the angle θhb (refer to FIG. 25A) of the arm stopper mechanism 60 according to the comparative example so as to reduce a value of the bending load vector Wt applied to the output shaft 22.

That is, as illustrated in FIG. 10, according to the configuration of the arm stopper mechanism 160 according to the first embodiment, in a case where the saddle-type vehicle is turned to the maximum while travelling, the steering arm 161 comes into contact with the stopper 162, and the striking load vector Wb is input to the steering arm 161, when the wheel (front wheel) 9 on an inner side during the turning collides with the protrusion (stone or the like) 511, and the input load vector Wh is input to the steering arm 161 via the tie rod 8, and the bending load vector Wt (refer to FIG. 15), which is applied to the output shaft 22 from the steering arm 161, and bends the output shaft 22, is reduced.

Specifically, as illustrated in FIG. 12, in the configuration of the arm stopper mechanism 160 according to the first embodiment, an angle θ176 made by a center line L161 and the striking surface 176 in the steering arm 161 is set to be smaller than the angle θ76 (refer to FIGS. 25A to 25C) of the arm stopper mechanism 60 according to the comparative example. As illustrated in FIGS. 13A and 13B, an angle θ186 made by a center line 162L and the striking surface 186 in the stopper 162 is set to be greater than the angle θ86 (refer to FIG. 25A) of the arm stopper mechanism 60 according to the comparative example.

Figure 14A:
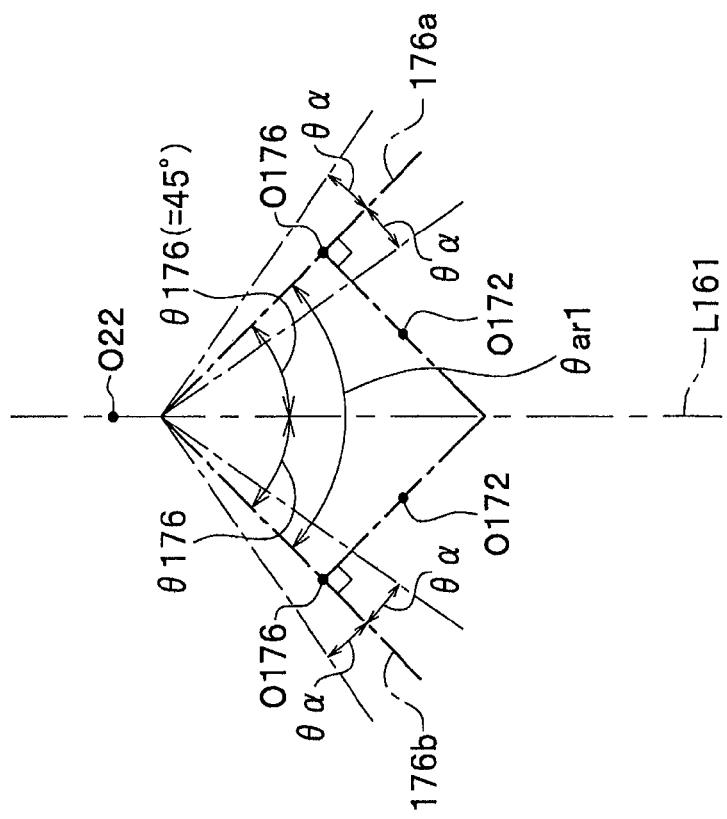
FIGS. 14A and 14B are schematic views illustrating an ideal configuration of portions of the steering arm of the arm stopper mechanism according to the first embodiment.
Figure 14B:
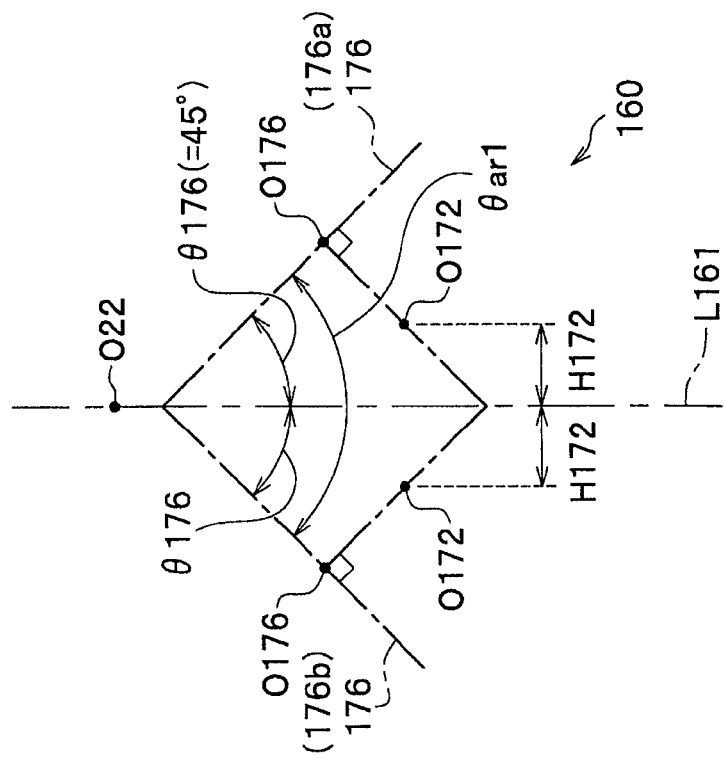

Hereinafter, the configuration of the arm stopper mechanism 160 according to the first embodiment will be described with reference to FIGS. 11 to 14B. FIG. 11 is a schematic bottom view illustrating the configuration of the arm stopper mechanism 160. FIGS. 12A and 12B are schematic bottom views illustrating the steering arm 161 of the arm stopper mechanism 160. FIG. 12A illustrates the configuration of portions of the steering arm 161, and FIG. 12B illustrates the disposition position of each portion of the steering arm 161. FIGS. 13A and 13B are schematic bottom views illustrating the configuration of the stopper 162 of the arm stopper mechanism 160. FIG. 13A illustrates the configuration of portions of the stopper 162, and FIG. 13B illustrates the disposition position of each portion of the stopper 162. FIGS. 14A and 14B are schematic views illustrating an ideal dispositional relationship between the members of the arm stopper mechanism 160.

As illustrated in FIG. 11, the arm stopper mechanism 160 is different from the arm stopper mechanism 60 according to the comparative example, in that the shapes of the steering arm 161 and the stopper 162 are different from those of the arm stopper mechanism 60.

FIG. 11 is a bottom view illustrating the configuration of the arm stopper mechanism 160. As illustrated in FIG. 11, the arm stopper mechanism 160 includes the steering arm 161 that turns about the output shaft 22, and the stopper 162. The steering arm 161 is spline-joined to the output shaft 22, and the steering arm 161 together with the output shaft 22 turns about the center point O22 (center axis line) of the output shaft 22.

As illustrated in FIG. 2, the entirety of a main body of the steering arm 161 (portion of the steering arm 161 to which the tie rods 8 are attached) is made to have a plate shape. As illustrated in FIG. 11 and FIGS. 12A and 12B, when seen from below, the steering arm 161 is deployed in a fan shape, the center angle of which is an acute angle, and the opposite wings of which are respectively bent circumferentially outward from middle points of the wings. That is, the width of the steering arm 161 increases gradually from a proximal end portion to a distal end portion of the steering arm 161. The steering arm 161 is bilaterally symmetrical with respect to the center line L161. The tip end portion of each of opposite side surfaces of the steering arm 161 is bent circumferentially outward further than a substantially radial middle portion of each side surface.

As illustrated in FIGS. 12A and 12B, the steering arm 161 is made into a shape in which an output shaft hole 171 is disposed at the position of a pivot (center axis) of the fan shape, and two tie rod holes 172a and 172b are respectively disposed at arbitrary positions in the vicinity of a free end (outer circumferential edge) of the fan shape. Hereinafter, the tie rod holes 172a and 172b are referred to as the "tie rod holes 172" as a generic term. That is, the output shaft hole 171 having a circular cross section passes through the proximal end portion of the steering arm 161, and the tie rod holes 172a and 172b pass through the distal end portion thereof.

The output shaft 22 is fitted into the output shaft hole 171, and thereby the center point of the output shaft hole 171 coincides with the center point O22 of the output shaft 22. Hereinafter, the center point of the output shaft hole 171 refers to the "center point O22".

The tie rod holes 172a and 172b are respectively disposed at positions which are equally separated from the center line L161 of the steering arm 161 to the left and the right. The center line L161 is an imaginary line that extends through the center point O22 of the output shaft hole 171 in a radial direction, and bisects the substantially fan-shaped steering arm 161 in the circumferential direction. That is, the center line L161 is a center line of the circumferential symmetry of the steering arm 161. In the example illustrated in FIGS. 12A and 12B, a center point O172 of each of the tie rod holes 172a and 172b is disposed at a position which is separated by a distance of T172 from the center point O22 of the output shaft hole 171 to the rear, and which is separated by a distance of H172 from the center line L161 of the steering arm 161 to the right or the left.

In the description herein, the "center line L161 of the steering arm 161" is an imaginary straight line that passes through the center point O22 of the output shaft hole 171 and extends in the longitudinal direction. When the steering angle of the handlebars 2 is 0° in a neutral state, the "center line L161 of the steering arm 161" coincides with a "center line L162 (refer to FIGS. 13A and 13B) of the stopper 162" which will be described later. The "center line L162 of the stopper 162" is the center line of the entirety of the vehicle (imaginary straight line that passes through the center point of the vehicle in the lateral direction and extends in the longitudinal direction of the vehicle).

The steering arm 161 includes a circular arc portion 178 having a radius of H178 that surrounds the output shaft hole 171, and the surrounding shape of the circular arc portion 178 is a circular arc shape. The steering arm 161 includes portions (portions that project outward) 174a and 174b which are respectively bent circumferentially outward from the middle points of the opposite wings of the fan shape, and the portions 174a and 174b function as striking portions which strike against the stopper 162. Hereinafter, the portions 174a and 174b are respectively referred to as "striking portion 174a"

and "striking portion 174b". The striking portions 174a and 174b are referred to as the "striking portion 174" as a generic term.

The striking portions 174a and 174b include flat surfaces 176a and 176b which are formed in side portions of the main body (portion to which the tie rods 8 are attached) of the plate-shaped steering arm 161, respectively, and the flat surfaces 176a and 176b function as striking surfaces which strike against the stopper 162. That is, in the opposite side surfaces of the steering arm 161, the striking surfaces 176a and 176b are formed closer to the distal end portion than the middle portion in the radial direction. Hereinafter, the flat surfaces 176a and 176b are referred to as "striking surfaces 176a and 176b", respectively. The striking surfaces 176a and 176b are referred to as the "striking surface 176" as a generic term.

In FIGS. 12A and 12B, a line L176a is an imaginary straight line that is disposed along the striking surface 176a. A line L176b is an imaginary straight line that is disposed along the striking surface 176b. A length H176 is the distance between a point O162 at which the lines L176a and 176b of the steering arm 161 intersect, and an end portion of the striking surface 176.

In contrast, as illustrated in FIG. 2, the stopper 162 is provided to protrude downward from the lower surface of the housing 113 of the motor-driven power steering apparatus 101. As illustrated in FIGS. 13A and 13B, when seen from below, the shape of the stopper 162 is made by joining (assembling) a lower base of a trapezoidal portion 162a having a substantially trapezoidal shape to a long side of a rectangular portion 162b having a substantially rectangular shape.

The trapezoidal portion 162a and the rectangular portion 162b are disposed so as to perpendicularly intersect the center line L162 of the stopper 162, and extend in the lateral direction. In the description herein, the "center line L162 of the stopper 162" is an imaginary straight line that passes through the center point O22 of the output shaft 22 and extends in the longitudinal direction. The "center line L162 of the stopper 162" is the center line of the entirety of the vehicle.

The trapezoidal portion 162a and the rectangular portion 162b are disposed in such a manner that the center point O22 of the output shaft 22 coincides with a center point of the lower base of the trapezoidal portion 162a and a center point of a long side of the rectangular portion 162b. A cut-away portion 181 (refer to FIG. 13A) is formed in the stopper 162, and the cut-away portion 181 is concave near a front side and has a semicircular shape so as to surround a front half of the output shaft 22 while having the center point O22 of the output shaft 22 as its center. That is, the cut-away portion 181 is a semicircular concave portion which is formed at the lateral center of a rear edge portion of the stopper 162, and the rear of which is open. The output shaft 22 is inserted into the cut-away portion 181, and the center point O22 of the output shaft 22 is disposed inside the cut-away portion 181.

The amount of protrusion of the stopper 162 from the lower surface of the housing 113 increases from a front end of the trapezoidal portion 162a to a rear end of the rectangular portion 162b. The contact surfaces 186a and 186b are respectively formed on left and right sides of a rear end surface of the rectangular portion 162b. According to the configuration of the stopper 162, only the striking surface 186 is brought into contact with the steering arm 161.

In the example illustrated in FIGS. 13A and 13B, the shape of the trapezoidal portion 162a is made to have an upper base having a width of H162a; the lower base having a width of H162b; and a height of T162a. The shape of the rectangular portion 162b is made to have the long side having a width of H162b, and a short side having a width of T162b.

The short side of the rectangular portion 162b is set to have a width of T162b that is the same value as a separation distance T176 (refer to FIG. 12B) set in the steering arm 161. The separation distance T176 is the distance between the striking surface 176, and a parallel plane that passes through the center point O22 of the output shaft hole 171 of the steering arm 161 and is parallel with the striking surface 176. The flat surfaces 186a and 186b are positioned on the other long side of the rectangular portion 162b, which is not joined to the trapezoidal portion 162a, and the flat surfaces 186a and 186b function as the contact surfaces that are brought into contact with the striking surface 176 (refer to FIG. 12A) of the steering arm 161. Hereinafter, the flat surfaces 186a and 186b are respectively referred to as "contact surfaces 186a and 186b". The contact surfaces 186a and 186b are referred to as the "contact surface 186" as a general term.

In the stopper 162, the angle θ186 made by the center line L162 of the stopper 162 and the contact surface 186 is set to be 90°. Accordingly, an angle θst1 made by the contact surfaces 186a and 186b (angle between two contact surfaces 186a and 186b, and an angle formed in the stopper 162) is set to be 180°. That is, the contact surfaces 186a and 186b are open at an angle of 180°, and the center of the opening is located at a lateral middle position (point O186) of the rear edge portion of the rectangular portion 162b.

In FIGS. 13A and 13B, a line L186a is an imaginary straight line that is disposed along the contact surface 186a. A line L186b is an imaginary straight line that is disposed along the contact surface 186b. The point O186 is a point at which the lines L186a and 186b of the stopper 162 intersect. In the example illustrated in FIGS. 13A and 13B, since the angle θst1 is set to be 180°, the lines L186a and L186b overlap each other.

In the arm stopper mechanism 160, the portions of the steering arm 161 are preferably configured as illustrated in FIGS. 14A and 14B. FIGS. 14A and 14B are schematic views illustrating an ideal configuration of the members of the arm stopper mechanism 160. FIG. 14A illustrates the disposition position of each portion of the steering arm 161, and FIG. 14B illustrates the disposition angle of each of the striking surfaces 176a and 176b of the steering arm 161.

Here, the disposition position of the striking surface 176 (refer to FIG. 12A) of the steering arm 161 will be mainly described. In the stopper 162 (refer to FIGS. 2 and 11) struck by the striking surface 176 of the steering arm 161, the portions of the stopper 162 are configured to correspond to the steering arm 161.

In FIGS. 14A and 14B, the line L161 is the center line of the steering arm 161. The point O22 indicates the center point of the output shaft hole 171 (refer to FIG. 12A) of the steering arm 161, and the center point of the output shaft 22. The point O172 is the center point of the tie rod hole 172 (refer to FIG. 12A) of the steering arm 161. A point O176 is the striking center position of the steering arm 161 (that is, a center position of a contact portion between the striking surface 176 of the steering arm 161 and the contact surface 186 (refer to FIG. 13A) of the stopper 162 according to the first embodiment). A length H172 is the distance from the center line L161 of the steering arm 161 to the center point O172 of the tie rod hole 172.

In the arm stopper mechanism 160, as can be understood from the characteristics of the arm stopper mechanism 60 according to the comparative example illustrated in FIG. 25A, and the arm stopper mechanism according to the first and second review examples illustrated in FIGS. 25B and 25C, it is possible to increase the angle θhb made by the respective directions of the input load vector Wh and the striking load vector Wb, by decreasing the angle θ176 made by the center line L161 and the striking surface 176 in the steering arm 161, or by increasing the angle θ186 made by the center line L162 and the contact surface 186 in the stopper 162. Accordingly, in the arm stopper mechanism 160, the input load vector Wh and the striking load vector Wb can be applied to cancel each other out, and thereby it is possible to reduce the value of the bending load vector Wt applied to the output shaft 22.

In the arm stopper mechanism 160, the angle θ176 made by the center line L161 and the striking surface 176 in the steering arm 161 is set to be smaller than the angle θ76 (refer to FIG. 25A) of the steering arm 61 of the arm stopper mechanism 60 according to the comparative example. That is, in the arm stopper mechanism 160, the angle θ186 made by the center line L162 and the contact surface 186 in the stopper 162 is set to be greater than the angle θ86 (refer to FIG. 25A) of the stopper 62 of the arm stopper mechanism 60 according to the comparative example.

The arm stopper mechanism 160 is required to restrict the turning angle of the handlebars 2 to an angle smaller than the maximum steering angle in order for the vehicle not to roll over in the lateral direction. For this reason, for example, in the steering arm 161 of the arm stopper mechanism 160, an optimum disposition angle for the angle θ176 is set to 45°, and an allowable design angle (hereinafter, referred to as an "allowable tilt angle") with respect to the angle θ176 is set to an angle θα (for example, 10°) so that the maximum steering angle of the handlebars 2 can be defined.

In order to satisfy these conditions, the arm stopper mechanism 160 is configured as follows: the striking surfaces 176a and 176b of the steering arm 161 are disposed to be tilted by an angle of (45±θα)° in opposite directions with respect to the center line L161, and the center of the tilting is the arbitrary point O162 on the center line L161 of the steering arm 161. That is, an angle θar1 made by the striking surfaces 176a and 176b of the steering arm 161 (angle between the two striking surfaces 176a and 176b, and an angle formed in the steering arm 161) is set to an angle of (90±2×θ)°. As such, the striking surfaces 176a and 176b are open at an angle of (90±2×θα)°, and the center of the opening is the point O162 on the center line L186.

For example, FIG. 11 illustrates the configuration of the arm stopper mechanism 160 when the allowable tilt angle θα is set to be 0°. In the example illustrated in FIG. 11, the angle θar1 made by the striking surfaces 176a and 176b (refer to FIGS. 12A and 12B) of the steering arm 161 is set to be 90°. The angle θst1 made by the contact surfaces 186a and 186b (refer to FIGS. 13A and 13B) of the stopper 162 is set to be 180°. The total angle θdr1, the sum of the maximum clockwise steering angle and the maximum counter-clockwise angle of the steering arm 161, is set to be 90° (that is, the maximum clockwise steering angle is 45°, and the maximum counter-clockwise steering angle is 45°).

Figure 15:
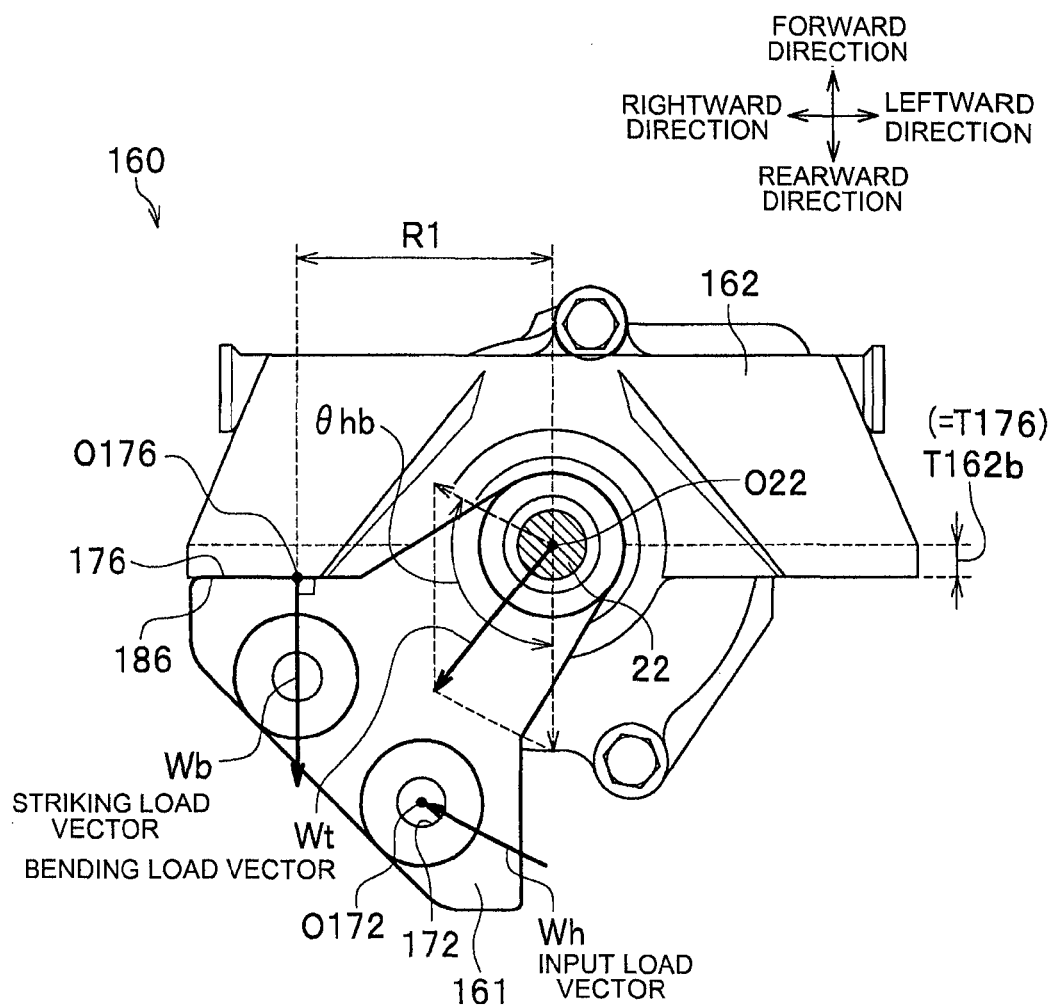
FIG. 15 is a view illustrating load vectors applied to main portions of the arm stopper mechanism according to the first embodiment.

6-2: Load Vectors Applied to Main Portions of Arm Stopper Mechanism According to First Embodiment Subsequently, load vectors applied to the main portions of the arm stopper mechanism 160 according to the first embodiment will be described with reference to FIG. 15. FIG. 15 is a view illustrating load vectors applied to the main portions of the arm stopper mechanism 160.

In the description herein, the "input load vector Wh" refers to a load vector that is input to the steering arm 161 from the wheel 9 (refer to FIG. 2) via the tie rod hole 172, the "striking load vector Wb" refers to a load vector that is applied to the striking surface 176 of the steering arm 161 from the contact surface 186 of the stopper 162, and the "bending load vector Wt" refers to a load vector that is applied to the output shaft 22 fitted into the output shaft hole 171 (refer to FIG. 12A).

In the description herein, the "striking center position O176" refers to the center position of the contact portion between the striking surface 176 of the steering arm 161 and the contact surface 186 of the stopper 162, and the striking load vector Wb is applied to the striking center position O176. In the example illustrated in FIG. 15, the striking center position O176 is set to a position that is separated by a distance of R1 from the center point O22 of the output shaft 22 to the right, and the distance T162b (that is, the distance T176 (refer to FIG. 12B)) from the center point O22 to the rear.

The description herein will be given based on an assumption that as illustrated in FIG. 15, the handlebars 2 are turned to the maximum steering angle in the counter-clockwise direction so as to turn the travelling saddle-type vehicle 100 to the left to the maximum, thereby the right striking surface 176b of the steering arm 161 striking the right contact surface 186b of the stopper 162, and the rear of the side surface of the left wheel (the left front wheel) 9 colliding with the protrusion 511 (refer to FIG. 10). At this time, according to the principle described in Section 3: Load Vectors Applied to Steering Arm, as illustrated in FIG. 15, in the arm stopper mechanism 160, the input load vector Wh is applied to the surroundings of the left tie rod hole 172, and the striking load vector Wb is applied to the striking center position O176. The bending load vector Wt, which is a combined vector of the input load vector Wh and the striking load vector Wb, is applied to the output shaft 22.

In this configuration, the value of the bending load vector Wt is the value of a combined vector of the input load vector Wh and the striking load vector Wb. When the striking surface 176 of the steering arm 161 is in contact with the contact surface 186 of the stopper 162, the direction of the input load vector Wh is determined by a direction in which the tie rod 8 (refer to FIG. 2) is attached to the tie rod hole 172. The direction of the striking load vector Wb is perpendicular to the striking surface 176 of the steering arm 161.

In the arm stopper mechanism 160, since the configuration of each of the steering arm 161 and the stopper 162 is as described above, the input load vector Wh and the striking load vector Wb are applied to cancel each other out. For this reason, in the arm stopper mechanism 160, it is possible to reduce the value of the bending load vector Wt applied to the output shaft 22 to further than that applied to the arm stopper mechanism 60 according to the comparative example. For this reason, in the arm stopper mechanism 160, it is possible to reduce a bending load applied to the output shaft 22.

In particular, in the arm stopper mechanism 160, the value of the bending load vector Wt applied to the output shaft 22 is preferably set to be less than or equal to the value of a combined vector of the input load vector Wh and the striking load vector Wb which are orthogonal to each other. Accordingly, in the arm stopper mechanism 160, it is possible to considerably reduce the value of the bending load vector Wt applied to the output shaft 22, and thereby it is possible to efficiently reduce a bending load applied to the output shaft 22.

In the arm stopper mechanism 160, the input load vector Wh and the striking load vector Wb can be applied to cancel each other out by setting the angle θst1 made by two contact surfaces 186 of the stopper 162 to an angle greater than the angle θar1 made by two striking surfaces 176 of the steering arm 161, and to 90° or greater. As a result, in the arm stopper mechanism 160, it is possible to reduce the value of the bending load vector Wt applied to the output shaft 22, and thereby it is possible to reduce a bending load applied to the output shaft 22. Accordingly, in the arm stopper mechanism 160, it is possible to reduce a load applied to the bearings 32A and 32B which support the output shaft 22; the bearing 31 (refer to FIG. 3) that supports the input shaft 21 which is connected to the output shaft 22 via the torsion bar 27; and the housing 113 (refer to FIG. 3) in the vicinity of the bearings 32A, 32B, and 31. A bending load applied to the output shaft 22 is reduced, and thereby the bending load as a strong reaction force does not propagate to the handlebars 2, and it is possible to improve the controllability of the handlebars 2.

However, in the arm stopper mechanism 160, since the angle θst1 made by the two contact surfaces 186 of the stopper 162 is set be greater than the angle ear1 made by the two striking surfaces 176 of the steering arm 161, and to 90° or greater, and it is possible to decrease the angle θar1 of the steering arm 161, it is possible to reduce the size of the steering arm 161.

Hereinafter, this point will be described. In the arm stopper mechanism 160, the steering arm 161 turns about the output shaft 22 in a region in which the stopper 162 is not present. Accordingly, as illustrated in FIG. 11, in the arm stopper mechanism 160, the angle of 360° of the circumference of the output shaft 22 is divided into the angle θst1 made by the two contact surfaces 186 of the stopper 162; the angle θar1 made by the two striking surfaces 176 of the steering arm 161; and the total angle θdr1 of the maximum clockwise steering angle and the maximum counter-clockwise steering angle of the steering arm 161. For this reason, in the configuration of the arm stopper mechanism 160, if the maximum clockwise steering angle and the maximum counter-clockwise steering angle remain unchanged, and the angle θst1 made by the two contact surfaces 186 of the stopper 162 increases, the angle θar1 made by the two striking surfaces 176 of the steering arm 161 decreases. As a result, the circumferential width of the steering arm 161 decreases, and it is possible to reduce the size of the steering arm 161.

In particular, in the configuration of the arm stopper mechanism 160, when the angle θst1 made by the two contact surfaces 186 of the stopper 162 is set to be 180° or greater, the angle ear1 made by the two striking surfaces 176 of the steering arm 161 decreases further. As a result, it is possible to further reduce the size of the steering arm 161 of the arm stopper mechanism 160.

At this time, in the arm stopper mechanism 160, since the size of the steering arm 161 is further reduced, it is possible to bring the striking center position O176 of the striking load vector Wb close to the vicinity of the tie rod hole 72 to which the input load vector Wh is applied. For this reason, at this time, in the arm stopper mechanism 160, it is possible to efficiently prevent the occurrence of vibration.

In the arm stopper mechanism 160, the total angle θdr1 of 90° or greater, which is the sum of the maximum clockwise steering angle and the maximum counter-clockwise angle of the steering arm 161, is preferably secured. For this reason, in the arm stopper mechanism 160, the total value of the angle θst1 made by the two contact surfaces 186 of the stopper 162, and the angle θar1 made by the two striking surfaces 176 of the steering arm 161 is preferably set to be 270° or less. Here, in the arm stopper mechanism 160, when these conditions are satisfied, it is possible to secure the total angle θdr1 of 90° or greater, which is the sum of the maximum clockwise steering angle and the maximum counter-clockwise angle of the steering arm 161.

As described above, the arm stopper mechanism 160 according to the first embodiment can reduce the value of the bending load vector Wt applied to the output. shaft 22. Accordingly, it is possible to reduce a load applied to the bearings 32A and 32B that support the output shaft 22; the bearing 31 (refer to FIG. 3) that supports the input shaft 21 which is connected to the output shaft 22 via the torsion bar 27; and the housing 113 (refer to FIG. 3) in the vicinity of the bearings 32A, 32B, and 31. Since a bending load is prevented from being applied to the output shaft 22, the bending load as a strong reaction force does not propagate to the handlebars 2, and thus it is possible to improve the controllability of the handlebars 2. It is possible to reduce the size of the steering arm 161. Since the motor-driven power steering apparatus 101 is equipped with the arm stopper mechanism 160, the motor-driven power steering apparatus 101 can improve the controllability of the handlebars 2.

Second Embodiment

In the arm stopper mechanism 160 according to the first embodiment, the striking surfaces 176 are respectively provided in the side portions of the main body (portion to which the tie rods 8 are attached) of the steering arm 161. In the configuration of the steering arm 161, the striking portions 174 with the striking surface 176 project outward (in a turning direction) so that the maximum steering angle of the handlebars 2 is defined.

In contrast, in the configuration of an arm stopper mechanism 260 according to a second embodiment, the striking portions do not project outward.

Configuration of Arm Stopper Mechanism According to Second Embodiment

Figure 16:
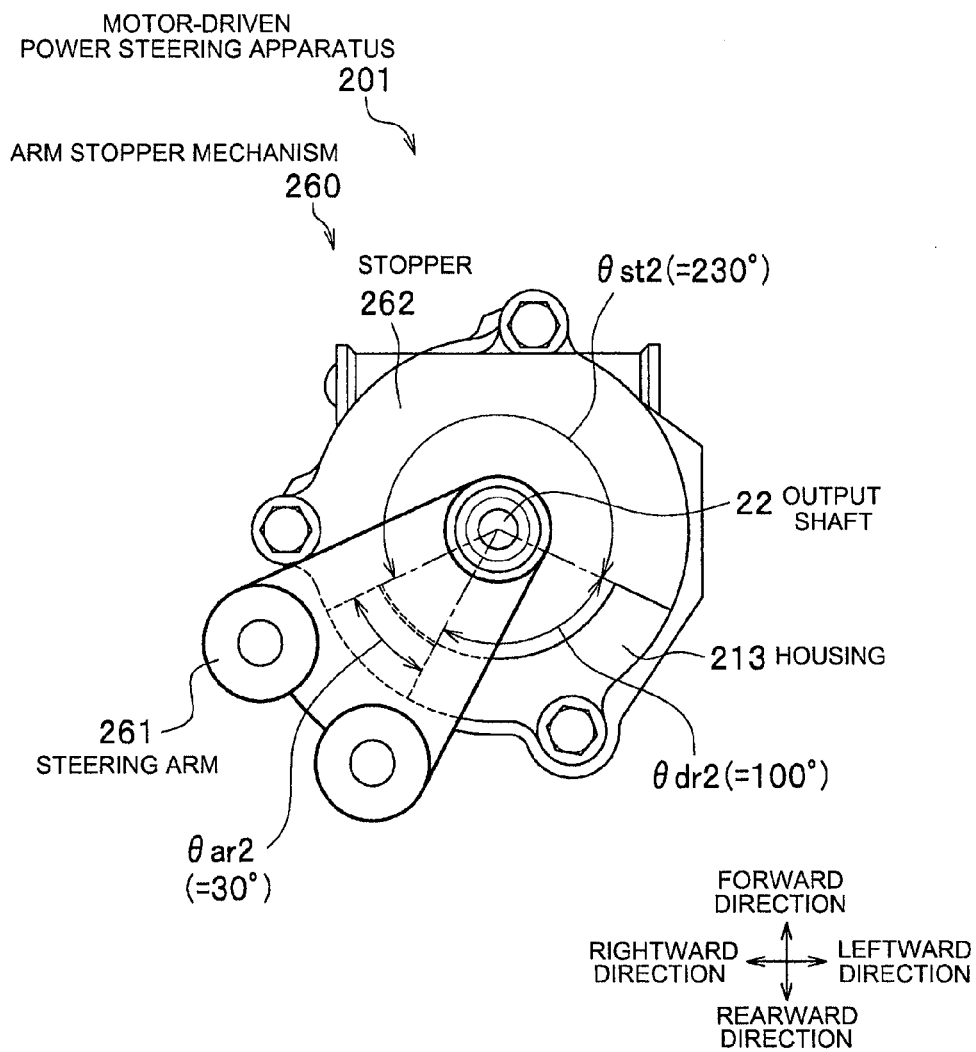
FIG. 16 is a schematic bottom view illustrating the configuration of an arm stopper mechanism according to a second embodiment.
Figure 17C:
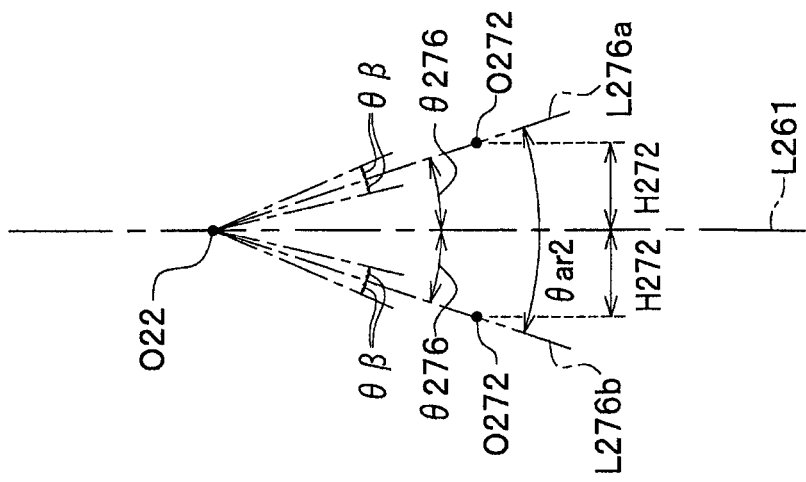
FIGS. 17A, 17B and 17C are schematic bottom views illustrating the configuration of a steering arm of the arm stopper mechanism according to the second embodiment.
Figure 17B:
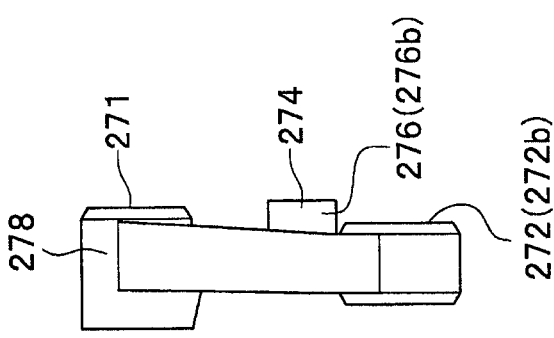
Figure 17A:
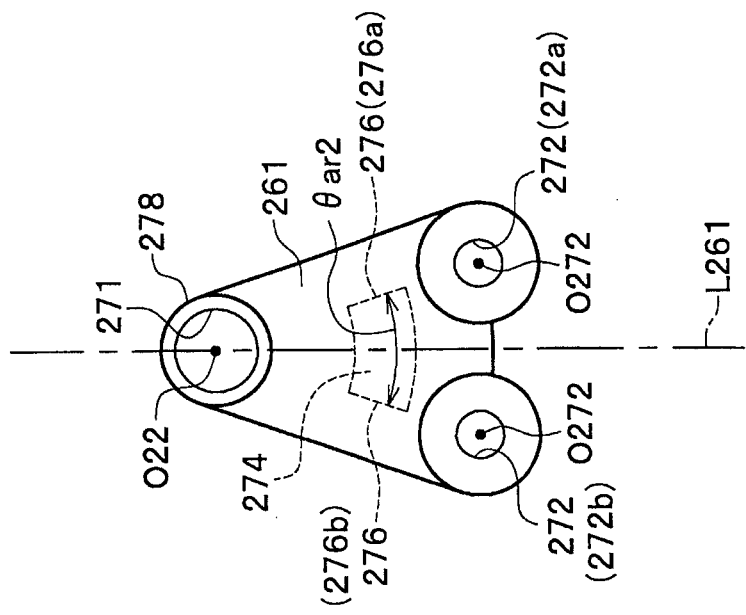
Figure 18:
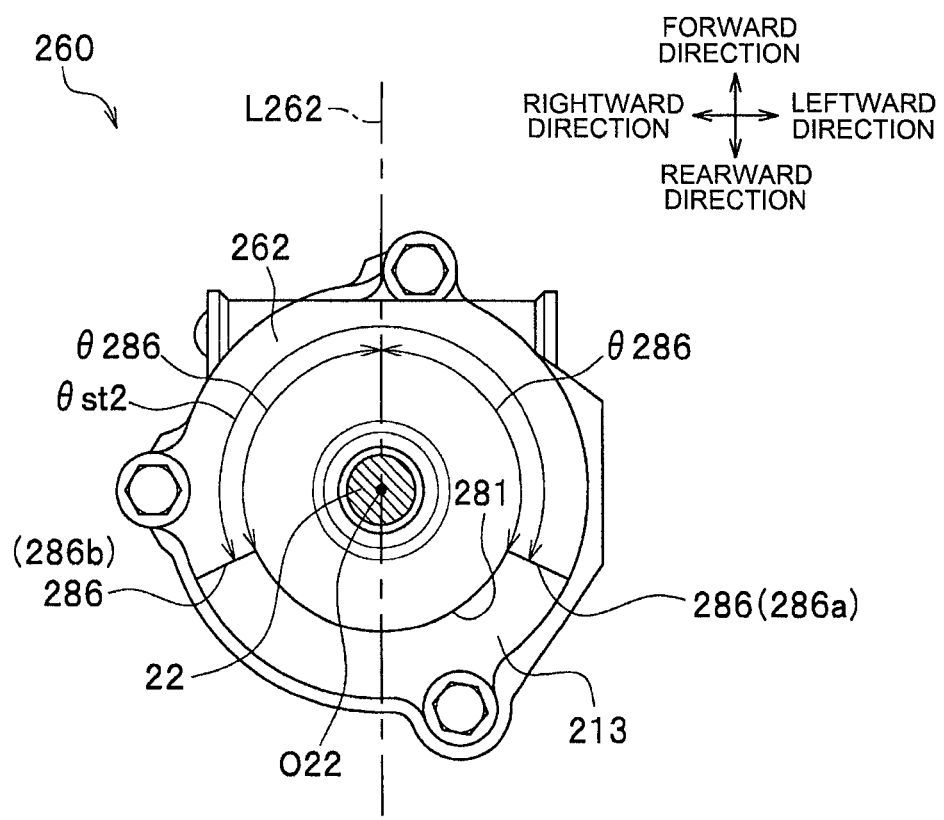
FIG. 18 is a schematic bottom view illustrating the configuration of a stopper of the arm stopper mechanism according to the second embodiment.

Hereinafter, the configuration of the arm stopper mechanism 260 according to the second embodiment will be described with reference to FIGS. 16 to 18. FIG. 16 is a schematic bottom view illustrating the configuration of the arm stopper mechanism 260. FIGS. 17A to 17C are schematic bottom views illustrating the configuration of a steering arm 261 of the arm stopper mechanism 260. FIG. 17A illustrates the configuration of portions of the steering arm 261, FIG. 17B is a side view illustrating the configuration of the steering arm 261, and FIG. 17C illustrates the disposition position of each portion of the steering arm 261. FIG. 18 is a schematic bottom view illustrating the configuration of a stopper 262 of the arm stopper mechanism 260. FIG. 18 illustrates the configuration of portions of the stopper 262.

FIG. 16 is a bottom view illustrating the configuration of the arm stopper mechanism 260. As illustrated in FIG. 16, the arm stopper mechanism 260 includes the steering arm 261 that turns about the output shaft 22, and the stopper 262.

As illustrated in FIG. 17B, the entirety of a main body (portion to which the tie rods 8 is attached) of the steering arm 261 has a plate shape. As illustrated in FIGS. 16 and 17A, in a bottom view, the steering arm 261 is deployed in a fan shape, the center angle of which is an acute angle. As illustrated in FIGS. 17A to 17C, the steering arm 261 is made into a shape in which an output shaft hole 271 is disposed at the position of a pivot (center axis) of the fan shape, and two tie rod holes 272a and 272b are respectively disposed in the vicinities of the opposite wings at a free end (outer circumferential edge) of the fan shape. Hereinafter, the tie rod holes 272a and 272b are referred to as a "tie rod hole 272" as a generic term.

The output shaft 22 is fitted into the output shaft hole 271, and thereby the center point of the output shaft hole 271 coincides with the center point O22 of the output shaft 22. Hereinafter, the center point of the output shaft hole 271 is referred to as the "center point O22".

When the steering arm 261 is in a neutral state, the tie rod holes 272a and 272b are respectively disposed at positions which are equally separated from a center line L261 of the steering arm 261 to the left and the right. In the example illustrated in FIG. 17C, a center point O272 of each of the tie rod holes 272a and 272b is disposed at a position which is present at the rear of the center point O22 of the output shaft hole 271, and which is separated by a distance of H272 from the center line L261 of the steering arm 261 to the right or the left.

In the description herein, the "center line L261 of the steering arm 261" is an imaginary straight line that passes through the center point O22 of the output shaft hole 271 and extends in the longitudinal direction. When the steering angle of the handlebars 2 is 0° (in a neutral state), the "center line L261 of the steering arm 261" coincides with a "center line L262 (refer to FIG. 18) of the stopper 262" which will be described later. The "center line L262 of the stopper 262" is a center line (imaginary straight line that passes through the center point of the vehicle in the lateral direction and extends in the longitudinal direction of the vehicle) of the entirety of the vehicle.

The steering arm 261 includes a circular arc portion 278 that surrounds the output shaft hole 271, and the surrounding shape of the circular arc portion 278 is a circular arc (circular) shape. The steering arm 261 includes a protruding portion 274 that protrudes upward from the vicinity of the center of a top surface of the main body (portion to which the tie rods 8 are attached) of the steering arm 261 (refer to FIGS. 17A and 17B), and the protruding portion 274 functions as a striking portion that strikes against the stopper 262. Hereinafter, the protruding portion 274 is referred to as a "striking portion 274".

The striking portion 274 include flat surfaces 276a and 276b which are formed in side portions of the striking portion 274, respectively, and the flat surfaces 276a and 276b function as striking surfaces which strike against the stopper 262. Hereinafter, the flat surfaces 276a and 276b are respectively referred to as "striking surfaces 276a and 276b". The striking surfaces 276a and 276b are referred to as a "striking surface 276" as a generic term.

In FIG. 17C, a line L276a is an imaginary straight line that is disposed along the striking surface 276a. A line L276b is an imaginary straight line that is disposed along the striking surface 276b.

In contrast, the stopper 262 is provided to protrude downward from a lower surface of a housing 213 of a motor-driven power steering apparatus 201. As illustrated in FIG. 18, when seen from below, the shape of the stopper 62 is made by cutting away a cut-away portion 281 from a substantially circular shape, and the cut-way portion 281 is one third of a circular arc, and the center of the circular arc is the center point O22 of the output shaft 22. End surfaces 286a and 286b of the stopper 262 function as contact surfaces, and are formed on circumferential outer sides of the stopper 262 by cutting away the cut-away portion 281. Hereinafter, the end surfaces 286a and 286b are respectively referred to as "contact surfaces 286a and 286b". The contact surfaces 286a and 286b are referred to as a "contact surface 286" as a generic term.

In the description herein, the "center line L262 of the stopper 262" is an imaginary straight line that passes through the center point O22 of the output shat 22 and extends in the longitudinal direction. The "center line L262 of the stopper 262" is the center line of the entirety of the vehicle.

In the arm stopper mechanism 260, as can be understood from the characteristics of the arm stopper mechanism 60 according to the comparative example illustrated in FIG. 25A, and the arm stopper mechanism according to the first and second review examples illustrated in FIGS. 25B and 25C, it is possible to increase the angle θhb (refer to FIG. 19) made by the respective directions of the input load vector Wh and the striking load vector Wb, by decreasing an angle θ276 (refer to FIG. 17C) made by the center line L261 and the striking surface 276 in the steering arm 261, or by increasing an angle θ286 (refer to FIG. 18) made by the center line L262 and the contact surface 286 in the stopper 262. Accordingly, in the arm stopper mechanism 260, the input load vector Wh and the striking load vector Wb can be applied to cancel each other out, and thereby it is possible to reduce the value of the bending load vector Wt applied to the output shaft 22.

In the arm stopper mechanism 260, the angle θ276 (refer to FIG. 17C) made by the center line L261 and the striking surface 276 in the steering arm 261 is set to be smaller than the angle θ76 (refer to FIG. 25C) of the steering arm 61 of the arm stopper mechanism 60 according to the comparative example. That is, in the stopper 262 of the arm stopper mechanism 260, the angle θ286 (refer to FIG. 18) made by the center line L262 and the contact surface 286 in the stopper 262 is set to be smaller than the angle θ86 (refer to FIG. 25A) of the stopper 62 of the arm stopper mechanism 60 according to the comparative example.

The arm stopper mechanism 260 is required to restrict the turning angle of the handlebars 2 to an angle smaller than the maximum steering angle in order for the vehicle not to roll over in the lateral direction. For this reason, for example, in the steering arm 261 of the arm stopper mechanism 260, an optimum disposition angle of the striking surface 276 with respect to the center line L261 is set to the tilt angle θ276 of each of the imaginary straight lines L276a and L276b with respect to the center line L261, in which each of the straight lines connects the center point O272 of the tie rod hole 272 and the center point O22 of the output shaft hole 271, and a design tilt angle allowable with respect to the angle θ276 is set to an angle θβ (for example 5°) so that the maximum steering angle of the handlebars 2 can be defined.

In order to satisfy these conditions, the arm stopper mechanism 260 is configured as follows: the striking surfaces 276a and 276b of the steering arm 261 are disposed to be tilted by an angle of (θ276±θβ)° in opposite directions with respect to the center line L261, and the center of the tilting is the center point O22 of the output shaft hole 271 (refer to FIG. 17C). That is, an angle θar2 made by the striking surfaces 276a and 276b of the steering arm 261 (angle between the two striking surfaces 276a and 276b, and an angle formed in the steering arm 261) is set to an angle of (2×(θ276±θβ))°.

For example, in the configuration of the arm stopper mechanism 260 illustrated in FIG. 16, the tilt angle θ276 of each of the straight lines L276a and L276b is set to be 15° (that is, the angle θar2 made by the striking surfaces 276a and 276b (refer to FIGS. 17A to 17C) of the steering arm 261 is set to be 30)°, and the allowable tilt angle θβ is set to be 0°. In the example illustrated in FIG. 16, in the arm stopper mechanism 260, the angle θar2 made by the striking surfaces 276a and 276b (refer to FIGS. 17A to 17C) of the steering arm 261 is set to be 30°. An angle θst2 made by the contact surfaces 286a and 286b (refer to FIG. 18) of the stopper 262 (angle between two contact surfaces 286a and 286b, and an angle formed in the stopper 262) is set to be 230°. A total angle θdr2, which is the sum of the maximum clockwise steering angle and the maximum counter-clockwise steering angle of the steering arm 261, is set to be 100°.

Figure 19:
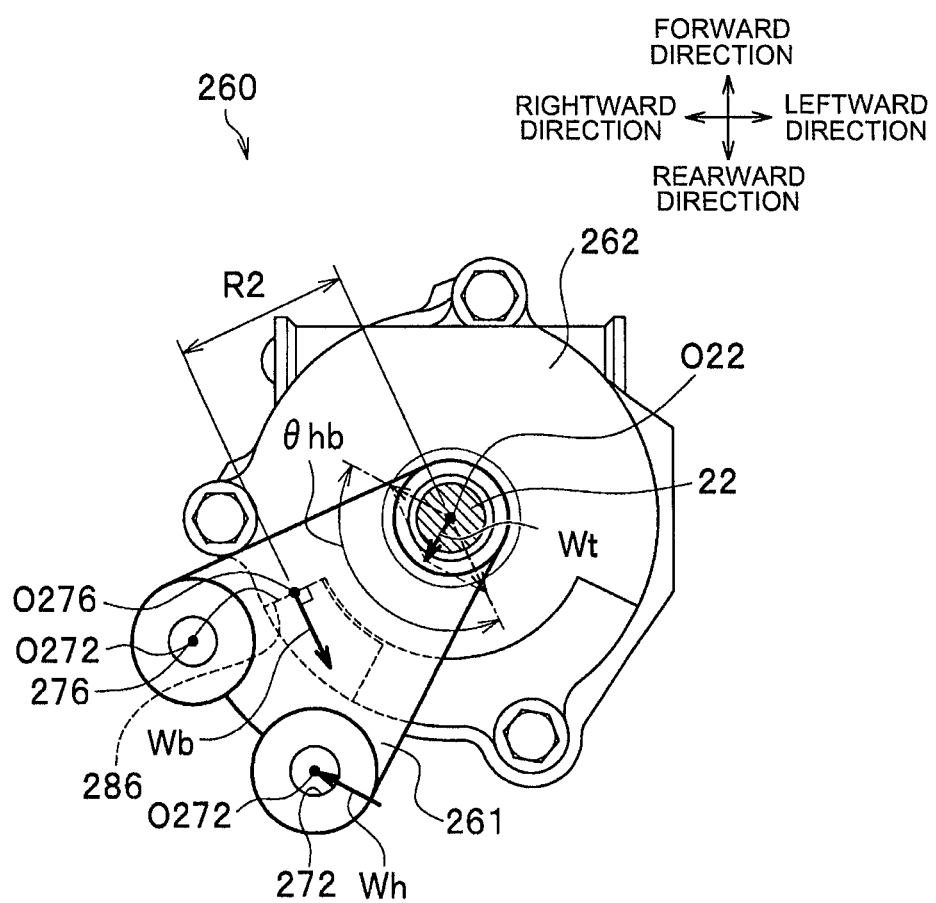
FIG. 19 is a view illustrating load vectors applied to main portions of the arm stopper mechanism according to the second embodiment.

Load Vectors Applied to Main Portions of Arm Stopper Mechanism According to Second Embodiment Hereinafter, load vectors applied to main portions of the arm stopper mechanism 260 will be described with reference to FIG. 19. FIG. 19 is a view illustrating the load vectors applied to the main portions of the arm stopper mechanism 260.

In the description herein, the "input load vector Wh" refers to a load vector that is input to the steering arm 261 from the wheel 9 (refer to FIG. 2) via the tie rod hole 272, the "striking load vector Wb" refers to a load vector that is applied to the striking surface 276 of the steering arm 261 from the contact surface 286 of the stopper 262, and the "bending load vector Wt" refers to a load vector that is applied to the output shaft 22 fitted into the output shaft hole 271 (refer to FIG. 17A).

In the description herein, a "striking center position O276" refers to a center position of a contact portion between the striking surface 276 of the steering arm 261 and the contact surface 286 of the stopper 262, and the striking load vector Wb is applied to the striking center position O276. In the example illustrated in FIG. 19, the striking center position O276 is set to a position which is present between the center point O22 of the output shaft 22 and the center point O272 of the tie rod hole 272, and which is separated by a distance of R2 from the center point O22.

The description herein will be given based on an assumption that as illustrated in FIG. 19, the handlebars 2 are turned to the maximum steering angle in the counter-clockwise direction so as to turn the travelling saddle-type vehicle 100 to the left to the maximum, thereby the right striking surface 276b of the steering arm 261 striking the right contact surface 286b of the stopper 262, and the rear of the side surface of the left wheel (the left front wheel) 9 colliding with the protrusion 511 (refer to FIG. 10). At this time, as illustrated in FIG. 19, in the arm stopper mechanism 260, the input load vector Wh is applied to the surroundings of the left tie rod hole 272, and the striking load vector Wb is applied to the striking center position O276. The bending load vector Wt, which is a combined vector of the input load vector Wh and the striking load vector Wb, is applied to the output shaft 22.

The value of the bending load vector Wt is the value of a combined vector of the input load vector Wh and the striking load vector Wb. When the striking surface 276 of the steering arm 261 is in contact with the contact surface 286 of the stopper 262, the direction of the input load vector Wh is determined by the attachment direction of the tie rod 8 (refer to FIG. 2) attached to the tie rod hole 272. The direction of the striking load vector Wb is perpendicular to the striking surface 276 of the steering arm 261.

In the arm stopper mechanism 260, since the configuration of each of the steering arm 261 and the stopper 262 is as described above, the input load vector Wh and the striking load vector Wb are applied to cancel each other out. For this reason, in the arm stopper mechanism 260, it is possible to reduce the value of the bending load vector Wt applied to the output shaft 22 to further than that applied to the arm stopper mechanism 60 according to the comparative example. For this reason, in the arm stopper mechanism 260, it is possible to reduce a bending load applied to the output shaft 22.

In particular, in the arm stopper mechanism 260, the value of the bending load vector Wt applied to the output shaft 22 is preferably set to be less than or equal to the value of a combined vector of the input load vector Wh and the striking load vector Wb which are orthogonal to each other. Accordingly, in the arm stopper mechanism 260, it is possible to considerably reduce the value of the bending load vector Wt applied to the output shaft 22, and thereby it is possible to efficiently reduce a bending load applied to the output shaft 22.

As described above, similar to the arm stopper mechanism 160 according to the first embodiment, in the arm stopper mechanism 260 according to the second embodiment, it is possible to reduce the value of the bending load vector Wt applied to the output shaft 22. Accordingly, it is possible to reduce a load applied to the bearings 32A and 32B which support the output shaft 22; the bearing 31 (refer to FIG. 3) that supports the input shaft 21 which is connected to the output shaft 22 via the torsion bar 27; and the housing 113 (refer to FIG. 3) in the vicinity of the bearings 32A, 32B, and 31. A bending load applied to the output shaft 22 is reduced, and thereby the bending load as a strong reaction force does not propagate to the handlebars 2, and it is possible to improve the controllability of the handlebars 2. However, since the striking portion 274 of the steering arm 261 does not project outward (in the turning direction), it is possible to decrease the size of the arm stopper mechanism 260 further than the arm stopper mechanism 160 according to the first embodiment. Since the motor-driven power steering apparatus 201 is equipped with the arm stopper mechanism 260, the motor-driven power steering apparatus 201 can improve the controllability of the handlebars 2.

The present invention is not limited to the embodiments, and various modifications can be made to the present invention insofar as the modifications do not depart from the scope of the present invention. For example, the present invention can also be applied to a steering apparatus that does not supplement assist power (that is, without the electric motor 24).

An arm stopper mechanism according to the present invention preferably has a steering arm which turns about an output shaft of a steering apparatus, and to which two tie rods, to which wheels are respectively connected, are attached; and a stopper that is provided in the vicinity of the output shaft, and restricts the turning angle of the steering arm. The steering arm preferably includes an output shaft hole into which the output shaft is fitted; two tie rod holes to which the tie rods are respectively attached; and two striking surfaces that strike against the stopper. The stopper preferably includes two contact surfaces that are respectively brought into contact with the two striking surfaces of the steering arm, and the arm stopper mechanism is preferably configured in such a manner that an input load vector, which is input via the tie rod hole distant from the striking surface, and a striking load vector applied to the striking surface are applied to cancel each other out, when any one of the two striking surfaces of the steering arm strikes against the contact surface of the stopper. The two striking surfaces are preferably disposed in such a manner that a bending load vector applied to the output shaft fitted into the output shaft hole is smaller than or equal to the value of a combined vector of the input load vector and the striking load vector which are orthogonal to each other. The direction of the input load vector is determined by an attachment direction of the tie road attached to the tie rod hole. The direction of the striking load vector is perpendicular to the striking surface of the steering arm.

In the configuration of each of the embodiments, as illustrated in FIG. 5A, the first worm damper 700A is disposed between the first flange portion 622c and the first inner ring 631, that is, at the axial inner side of the first bearing 630; however, in an example of another configuration, the first worm damper 700A may be disposed between the stopping member 660 (the second housing 113b) and the first outer ring 632, that is, at the axial outer side of the first bearing 630. Similarly, the second worm damper 700B may be disposed between the second housing 113b and the second outer ring 642, that is, at the axial outer side of the second bearing 640. In other words, the first worm damper 700A and the second worm damper 700B may be disposed at the axial outer sides of the first bearing 630 and the second bearing 640, respectively.

In the configuration of each of the embodiments, the worm 620 and the motor output shaft 24B are connected to each other via the joint 650 (refer to FIG. 7), and since the bush 653 is axially deformed, the worm 620 can move in the axial direction; however, in an example of another configuration, the worm 620 and the motor output shaft 24B may be serration-joined together, and the worm 620 and the motor output shaft 24B may be able to move relative to each other in the axial direction. In this case, for example, a male serration shaft is formed on the worm 620, and a female serration hole is formed in the motor output shaft 24B.

In the configuration of each of the embodiments, the elastic body 730 is a ring-shaped member made of rubber; however, in an example of another configuration, the elastic body 730 may be a compression coil spring.

What is claimed is:

1. A steering apparatus comprising:
   an output shaft that outputs a steering force to wheels of a vehicle;
   a steering arm which turns about the output shaft, and to which two tie rods, to which the wheels are respectively connected, are attached;
   a stopper which is provided in a vicinity of the output shaft, and restricts an angle of the turning of the steering arm;
   a worm wheel that is fixed to the output shaft;
   a worm that is driven by a motor, and meshes with the worm wheel;
   a bearing that rotatably support the worm;
   a housing that holds the bearing; and
   a worm damper that is provided at an axial inner side or an axial outer side of the bearing in an axial direction of the worm, and is elastically deformable so as to move the worm in the axial direction,
   wherein when an imaginary straight line that passes through the output shaft and extends in a longitudinal direction of the vehicle is defined as a center line of the steering arm, the steering arm comprises, in a neutral state:
   an output shaft hole which is provided on the center line, and into which the output shaft is fitted;
   two tie rod holes which are respectively provided at positions that are separate by a distance from the center line to a right and a left, and that are separated by a distance from the output shaft hole to a rear side of the vehicle, and to which the tie rods are respectively attached; and
   two striking surfaces which are respectively provided at positions that are separated by a distance from the center line to a right and a left, and that are separated by a distance from the output shaft hole to a rear side of the vehicle, and which are to strike against the stopper,
   the stopper comprises two contact surfaces that are respectively provided at positions that are separated by a distance from the center line to a right and a left, and that are present in a turning direction of the striking surfaces of the steering arm, and that are respectively to be brought into contact with the striking surfaces, and
   wherein an angle made by the two contact surfaces of the stopper is greater than an angle made by the two striking surfaces of the steering arm, and is 90° or greater.

2. The steering apparatus according to claim 1,
   wherein the worm comprises worm gear teeth that mesh with the worm wheel, and
   the worm damper is disposed between the bearing and the worm gear teeth.

3. The steering apparatus according to claim 1,
   wherein the worm damper has a ring shape, through which the worm passes, and comprises a first ring-shaped plate, a second ring-shaped plate, and a ring-shaped elastic body that is interposed between the first and second ring-shaped plates and is elastically deformable.

4. The steering apparatus according to claim 2,
   wherein the worm damper has a ring shape, through which the worm passes, and comprises a first ring-shaped plate, a second ring-shaped plate, and a ring-shaped elastic body that is interposed between the first and second ring-shaped plates and is elastically deformable.

* * * * *